United States Patent
Miller et al.

(10) Patent No.: US 7,949,039 B2
(45) Date of Patent: May 24, 2011

(54) HOME NETWORK TESTING

(75) Inventors: Walter Miller, Bargersville, IN (US);
Michael D. Gotwals, Greenwood, IN (US); Robert J. Flask, New Palestine, IN (US)

(73) Assignee: Acterna LLC, Germantown, MD (US)

( * ) Notice: Subject to any disclaimer, the term of this patent is extended or adjusted under 35 U.S.C. 154(b) by 1009 days.

(21) Appl. No.: 11/764,389

(22) Filed: Jun. 18, 2007

(65) Prior Publication Data
US 2008/0013612 A1    Jan. 17, 2008

Related U.S. Application Data

(60) Provisional application No. 60/805,126, filed on Jun. 19, 2006, provisional application No. 60/805,130, filed on Jun. 19, 2006.

(51) Int. Cl.
*H04B 3/46* (2006.01)
*H04B 17/00* (2006.01)
*H04Q 1/20* (2006.01)

(52) U.S. Cl. ........................ 375/224; 375/228

(58) Field of Classification Search ............... 375/224, 375/228
See application file for complete search history.

(56) References Cited

U.S. PATENT DOCUMENTS

| | | | |
|---|---|---|---|
| 6,747,996 B2 * | 6/2004 | Holloway et al. | 370/503 |
| 2003/0140279 A1 * | 7/2003 | Szucs et al. | 714/31 |
| 2003/0147523 A1 * | 8/2003 | Watson et al. | 379/344 |
| 2005/0034159 A1 * | 2/2005 | Ophir et al. | 725/78 |

* cited by examiner

*Primary Examiner* — Chieh M. Fan
*Assistant Examiner* — Freshteh N Aghdam
(74) *Attorney, Agent, or Firm* — Matthew A. Pequignot; Pequignot + Myers LLC

(57) ABSTRACT

A home network testing device includes an input port with any one or more of a variety of different connectors for receiving different types of communication cables, e.g. coaxial cable, telephone cable, and electrical cable; and a testing apparatus section with a variety of different testing apparatuses for testing for the presence of different forms of home networks, e.g. MoCA, HomePlug, and HPNA. The present invention uses discrete components to analyze the physical layer in the time domain, looking for a specifically timed RF power pulse that is characteristic of and different in each of the network protocols.

19 Claims, 23 Drawing Sheets

HOME NETWORK TESTING

CROSS-REFERENCE TO RELATED APPLICATIONS

The present invention claims priority from U.S. Patent Applications No. 60/805,126 filed Jun. 19, 2006 and U.S. Patent Applications No. 60/805,130 filed Jun. 19, 2006, which are incorporated herein by reference for all purposes.

TECHNICAL FIELD

The present invention relates to a test instrument for testing a plurality of different home networking technologies, e.g. MoCA, HPNAv3 and HomePlug, and in particular to a home network detection and measurement device based on physical layer characteristics.

BACKGROUND OF THE INVENTION

The Multimedia over Coaxial Alliance (MoCA™) utilize the vast amounts of unused bandwidth available on in-home coaxial cable to deliver voice, video and data (triple play) without the need for new connections, wiring, point of entry devices or truck rolls. Estimates show that 70% to 90% of homes in the United States already have coaxial cable installed into the home network infrastructure. Moreover, many homes have existing coaxial cable in one or more primary entertainment consumption locations, e.g. family rooms, media rooms and master bedrooms, facilitating the deployment of triple play networks. MoCA technology allows homeowners to utilize their existing coaxial cable infrastructure as a networking system and to deliver other entertainment and information programming with high quality of service (QoS).

The technology underlying MoCA provides the vital elements necessary to distribute DVD quality entertainment throughout the home, i.e. high speed (270 mbps), high quality of service (QoS), and the innate security of a shielded, wired connection, combined with state of the art packet-level encryption. Coaxial cable is designed for carrying high bandwidth video, and is regularly used to securely deliver millions of dollars of pay per view and premium video content on a daily basis. The MoCA network can also be used as a backbone for multiple wireless access points used to extend the reach of wireless throughout a consumer's entire home.

The Home Phone Line Networking Alliance (HPNA™) provides triple-play home networking solutions for distributing entertainment data over both existing coax cable and phone lines. By providing data rates up to 320 Mbps with guaranteed Quality of Service (QoS), HPNA technology enables service providers to meet and drive the growing demand for new multimedia services, such as IPTV and VoIP to the home. HPNA technology also provides consumers with the many benefits of "no-new-wires" home networking.

The HPNA technology, building on Ethernets, allows all the components of a home network to interact over the home's existing telephone wiring without disturbing the existing voice or fax services. In the same way a LAN operates, home networking processes, manages, transports and stores information, which enables the disparate devices in a home network, such as telephones, fax machines, desktops, laptops, printers, scanners and Web cameras to connect and integrate over a home's unpredictable wiring topology.

HomePlug™ 1.0 is the specification for a technology that connects devices to each other through the power lines in a home. HomePlug-certified products connect PCs and other devices that use Ethernet, USB and 802.11 "Wi-Fi" technologies to the power line via a HomePlug "bridge" or "adapter." Some products, such as connected audio players, even have HomePlug technology built-in. HomePlug products provide a simple solution for consumers interested in distributing connectivity around their homes without adding any new wires.

Since most electronic devices already use power outlets to receive power, the goal of the alliance was create a way that these same power outlets and electrical wires could be used to connect the devices to each other and to the Internet. Today, HomePlug networking is the only globally recognized standard for high-speed power line networking with millions of products in use on six continents.

Power outlets are the most pervasive home wiring medium. Power outlet connectivity is available worldwide, affording the use of multiple outlets in every room at a lower cost per connection point. HomePlug technology leverages existing power outlets to provide both power and connectivity. Additionally, the convenience of connecting any device through a power outlet will enable exciting new products covering entertainment, information access and telephony services.

Due to the diversity in home network technologies, i.e. coaxial cable, telephone line, and electrical wiring, conventional home network testing devices are typically dedicated to a single technology. Furthermore, a typical device attempting to analyze any one of these networks would employ a dedicated network chipset to detect and join the network.

An object of the present invention is to overcome the shortcomings of the prior art by providing a single home network testing device for use in testing home networks with different home network technologies, while leaving the network topology intact without affecting the number of devices on the network by using the physical layer characteristics of each of the previously discussed networking technologies to provide method to determine the presence and health of the network.

SUMMARY OF THE INVENTION

Accordingly, the present invention relates to a testing device for home networks comprising:

an input port for inputting a home network signal, the input port including connectors for mating with at least one cable selected from the group consisting of coaxial cables, telephone cables, and electrical cables;

a first filtering apparatus for removing all signals from the home network signal except those in a measurement band of a first home network technology generating a first filtered signal;

a second filtering apparatus for removing all signals from the home network signal except those in a measurement band of a second home network technology, different than the first home network technology, generating a second filtered signal;

measuring means connected to said first and second filtering apparatuses for determining which home network technology is present on a home network; and a switching means for selecting which one of the connectors to be connected with which one of the first and second filtering apparatuses, and which one of the first and second filtering apparatuses to be connected with the measuring means.

The present invention also relates to a testing device for home networks comprising:

an input port for inputting a home network signal, the input port including connectors for mating with a coaxial cable;

a filtering apparatus for removing all signals from the home network signal except those in a measurement band of a MoCA home network technology generating a filtered signal; and measuring means comprising an amplitude demodulator for generating a resultant voltage signal from the filtered signal connected to said filtering apparatus for determining whether a pulse that is about 90 μs to 110 μs wide and repeats approximately every 10 ms is present in the voltage signal, which is indicative of a MoCA home network technology being present on a home network.

Another embodiment of the present invention relates to a testing device for home networks comprising:

an input port for inputting a home network signal, the input port including connectors for mating with at least one cable selected from the group consisting of coaxial cables and telephone cables;

a filtering apparatus for removing all signals from the home network signal except those in a measurement band of a HPNA home network technology generating a filtered signal; and measuring means comprising an amplitude demodulator for generating a resultant voltage signal from the first filtered signal connected to said filtering apparatus for determining whether a pulse that is about 165 μs to 185 μs wide and repeats approximately every 15 ms is present in the voltage signal, which is indicative of a HPNA home network technology being present on a home network.

Another feature of the present invention relates to a testing device for home networks comprising:

an input port for inputting a home network signal, the input port including connectors for mating with at least one cable selected from the group consisting of coaxial cables, telephone cables, and electrical cables;

filtering means for removing all signals from the home network signal except those in a measurement band of a selected home network technology generating a first filtered signal; and measuring means connected to said filtering means for determining which home network technology is present on a home network;

wherein the measuring means comprises: an amplitude demodulator for generating a resultant voltage signal; and transforming means for conducting a fast Fourier transform on the resultant voltage signal generating a transformed signal;

wherein the measuring means detects a MoCA signal by identifying a product at approximately 100 Hz in the transformed signal; and wherein the measuring means detects an HPNA version 3 signal by identifying a produce at approximately 66.7 Hz in the transformed signal.

BRIEF DESCRIPTION OF THE DRAWINGS

The invention will be described in greater detail with reference to the accompanying drawings which represent preferred embodiments thereof, wherein.

DETAILED DESCRIPTION

The present invention is a test instrument that is designed to test a plurality of different home networking technologies, e.g. MoCA, HPNA, or HomePlug, which are typically mutually exclusive from a deployment perspective. An instrument that supports multiple networking technologies enables a service provider to select the best networking solution for each customer based on the customer's individual installation without having to employ separate test instruments, and provides a technician with a common interface for testing entirely different networking technologies.

Furthermore, the present invention relates to a test device for implementing a non-intrusive method of detecting the presence and level of a home network that is employing either MoCA, HPNA, or HomePlug. The topology of the network is left entirely intact, and measurements are conducted without affecting the number of devices on the network. The method according to the present invention uses discrete components to analyze the physical layer in the time domain, looking for a specifically timed RF power pulse that is characteristic of and different in each of the network protocols.

Tests were performed to provide characterizations of the basic physical layer signals present on the various networks, e.g. coax, telephone and electrical wiring, hosting MoCA, HPNA and HomePlug based devices. The goal of the tests was to build enough understanding to develop circuits that can detect the presents of these signals.

All testing on the MoCA based network were performed using Entropic ECP1001P Ethernet to MoCA Bridges, while AM RF measurements were performed using a Agilent E4443 Spectrum Analyzer. Detected Measurements were performed using a Wavetek D171 75 detector and a Pico Scope digital USB Oscilloscope (200 Msps). All testing was done on MoCA channel 11 1050 MHz, and the devices were configured to auto master.

Figure 1:
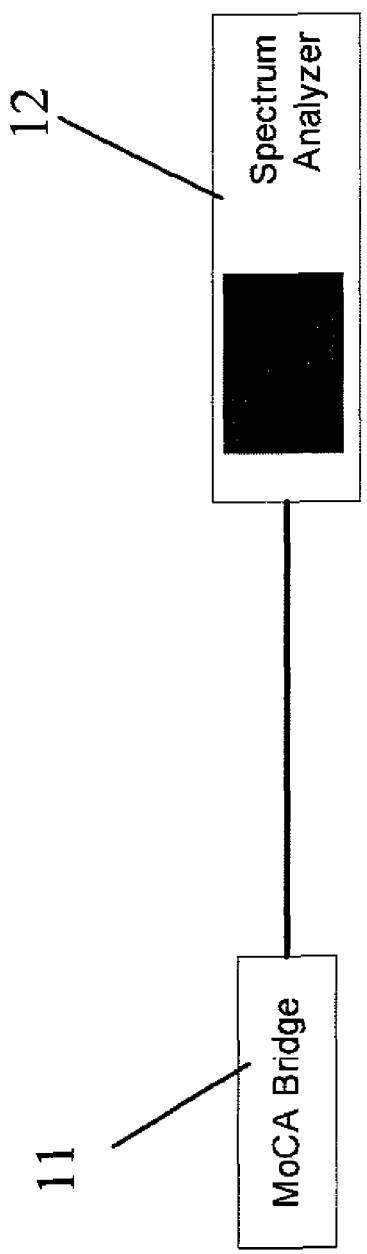
FIG. 1 is a schematic representation of a MoCA test arrangement.
Figure 2:
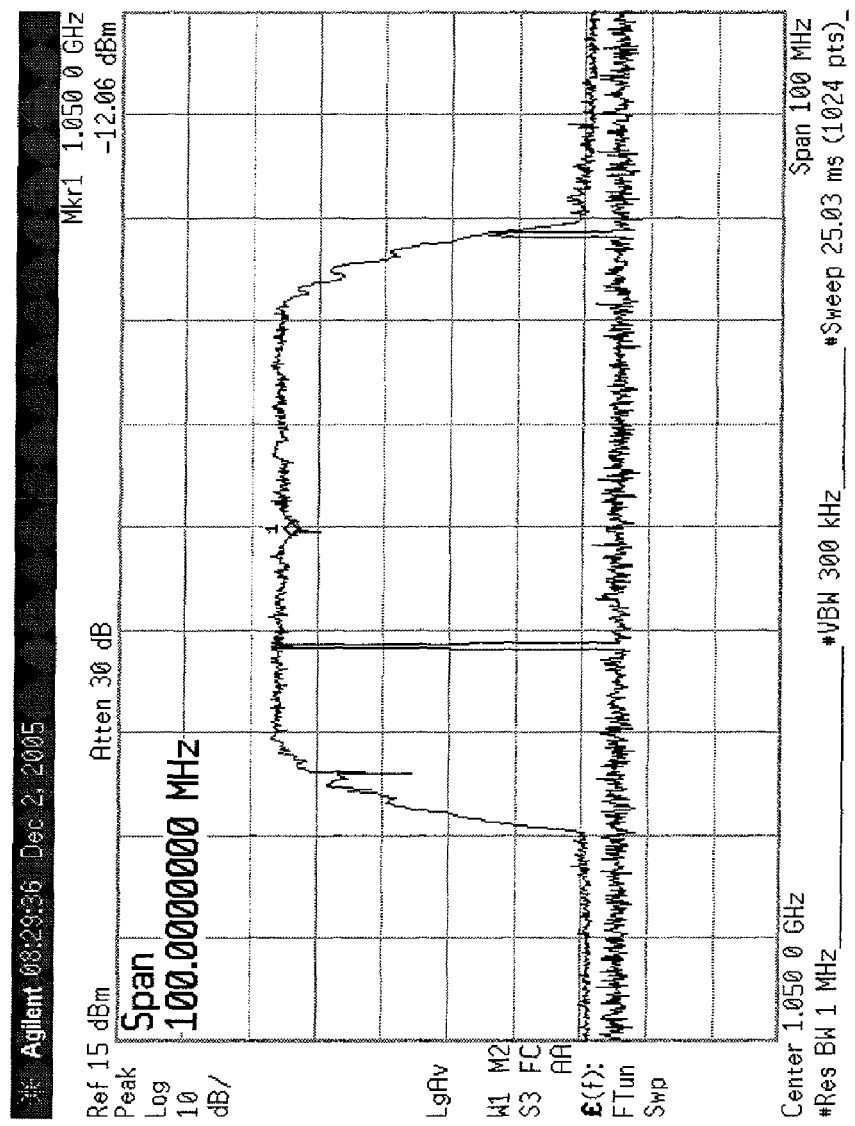
FIG. 2 illustrates a maximum hold trace of a spectrum directly out of the MoCA bridge device of FIG. 1.

FIG. 1 illustrates a test configurations with a single MoCA bridge 11 connected to the spectrum analyzer 12 with no Ethernet devices attached. The spectrum illustrated in FIG. 2 shows a maximum hold trace of a spectrum directly out of the MoCA bridge 11, which is the signal that would be present at the back of the set top box, e.g. Level −12 dBm (+36.75 dBmV) Bandwidth: 50 MHz; and a Signal to Noise ratio: 50 dB.

The MoCA bridge devices 11 should not be connected directly back to back, since the direct output of one bridge device is to high and may damage the input of the other bridge device. Typically a 20 dB pad should be provided between bridge devices. Accordingly, a maximum level exceeded warning is preferably provided on a testing device.

Figure 3:
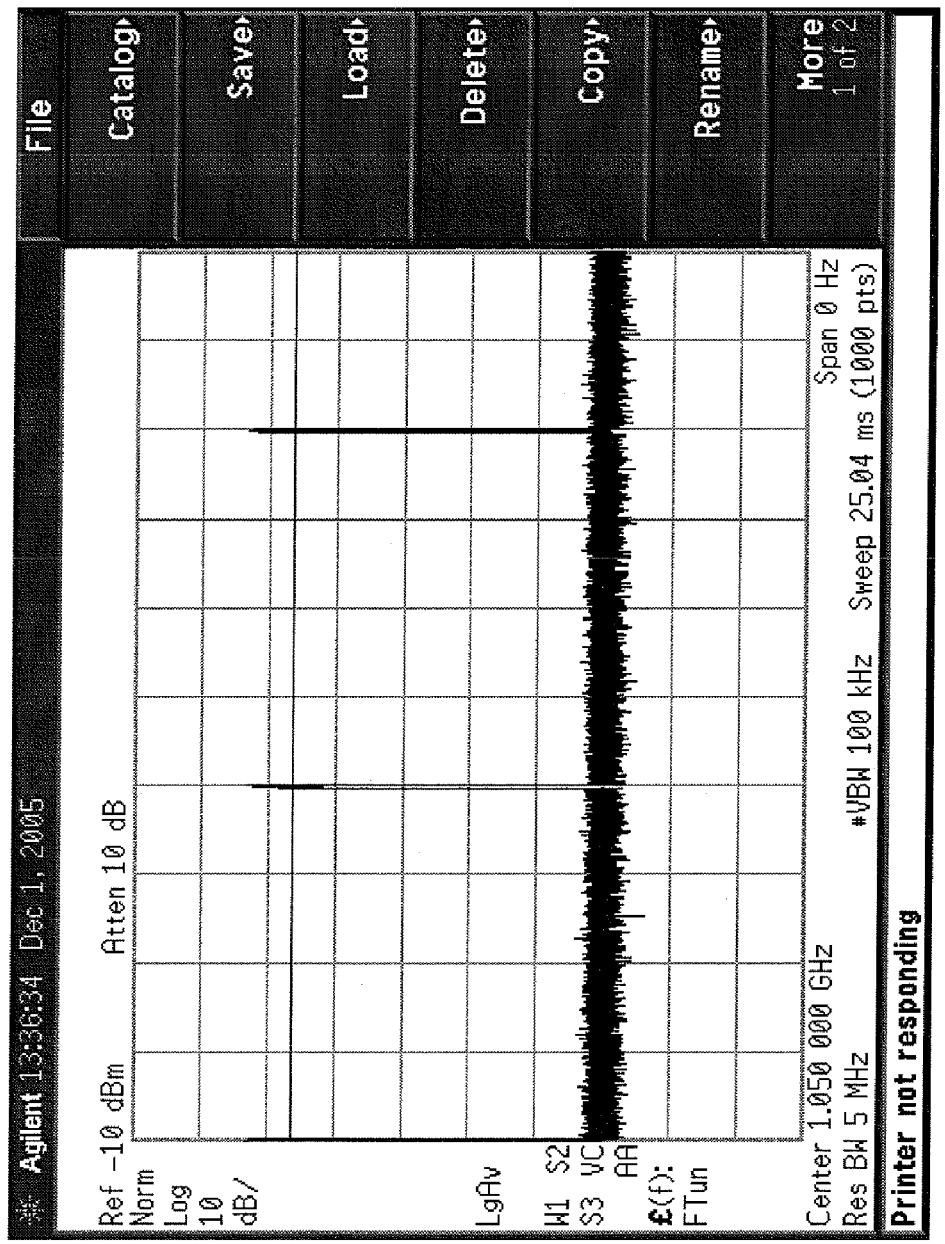
FIG. 3 is a zero span spectrum illustrating the timing of the single MoCA bridge device of FIG. 2.

The zero span spectrum, illustrated in FIG. 3, shows the timing of a single MoCA bridge device 11, which would be the typical signal present when a master set top is connected to the network and turned on, with no other devices present. A testing device could look for this signal to determine the presence of the master device and to verify the levels at the current test point are within acceptable level tolerance, for a slave device to function properly. A single MoCA bridge device sends out an RF signal every 10 mS (100 Hz)

Figure 4:
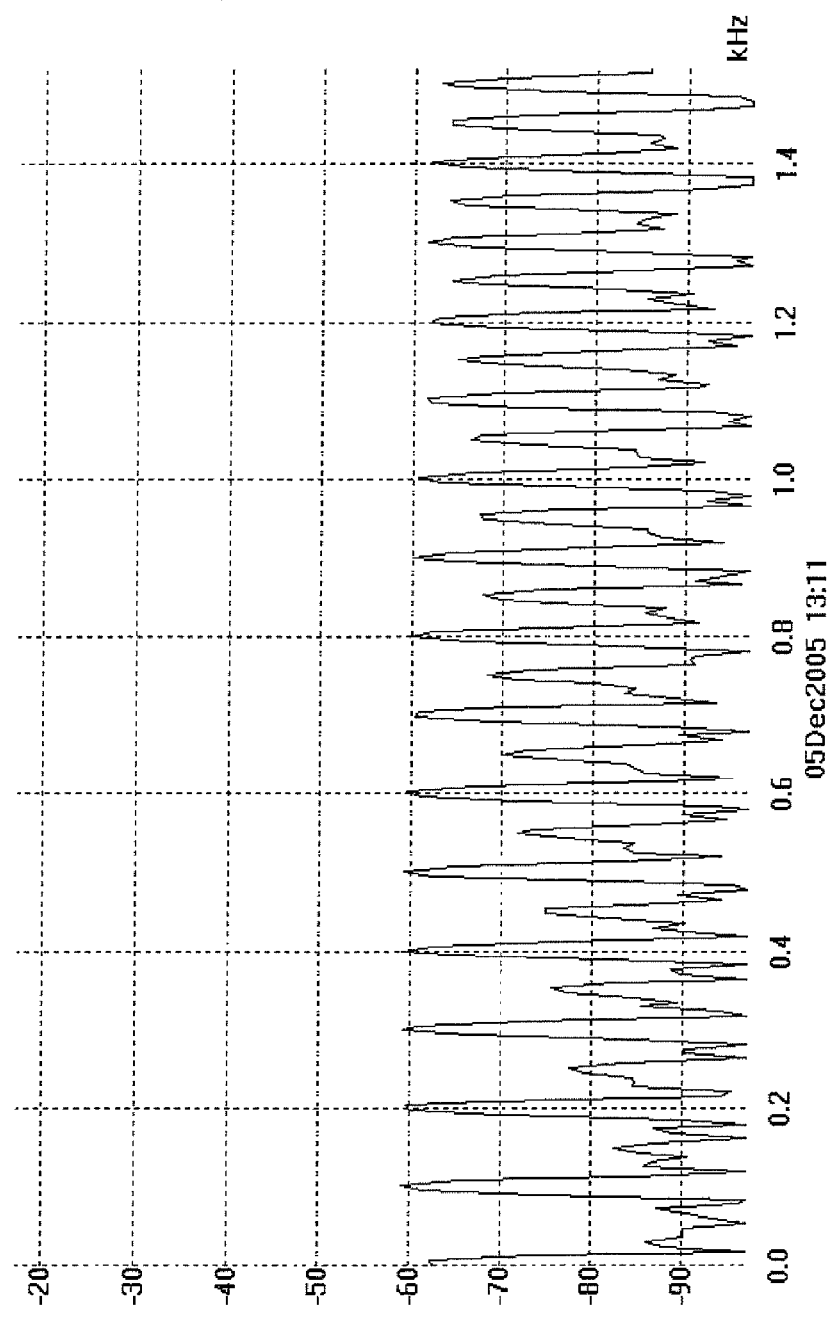
FIG. 4 illustrates an fast Fourier transform (FFT) of the detected spectrum of FIG. 3.

FIG. 4 illustrates an fast Fourier transform (FFT) of the detected spectrum of FIG. 3, in which the 100 Hz product is prominent in the spectrum. The product at approximately 100 Hz, e.g. 95 to 105 Hz, is present even when multiple devices are connected, and may be a data burst comprised of an administration message searching for other devices or comprised of the master device timing control messages.

Figure 5:
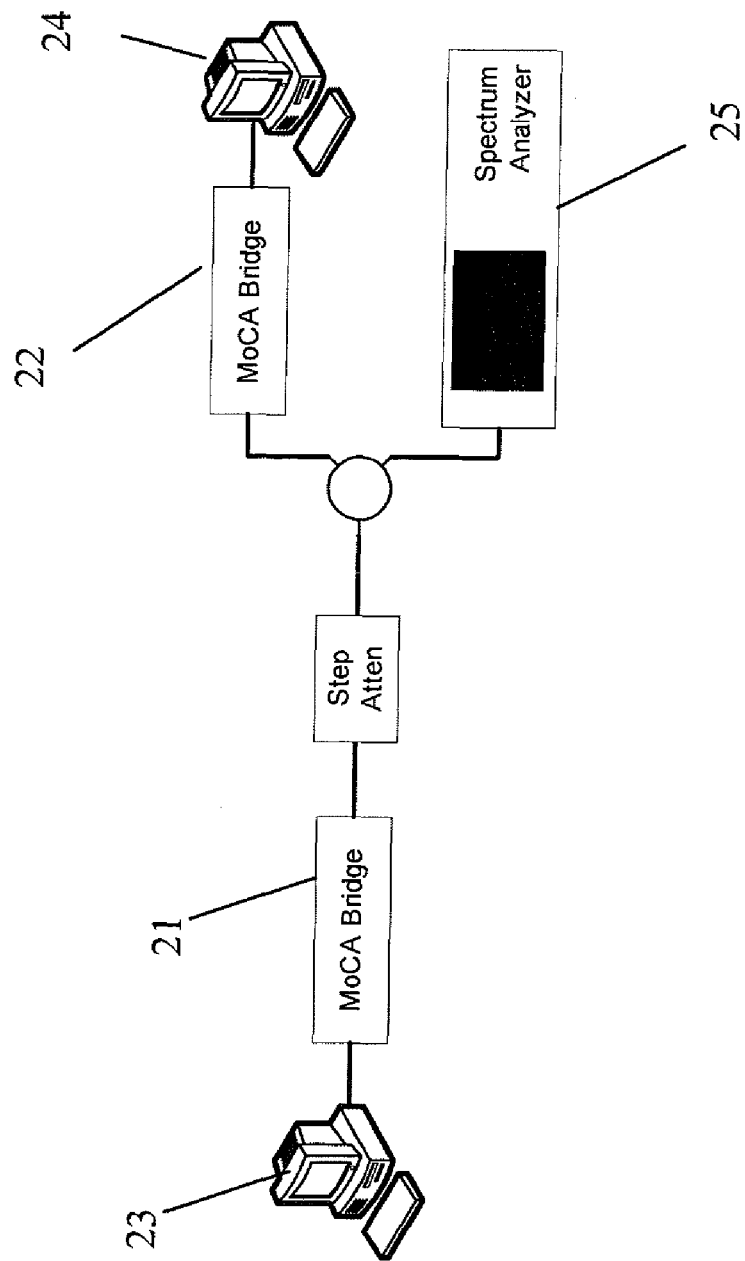
FIG. 5 is a schematic representation of a MoCA test arrangement with two MoCA bridge devices.
Figure 6:
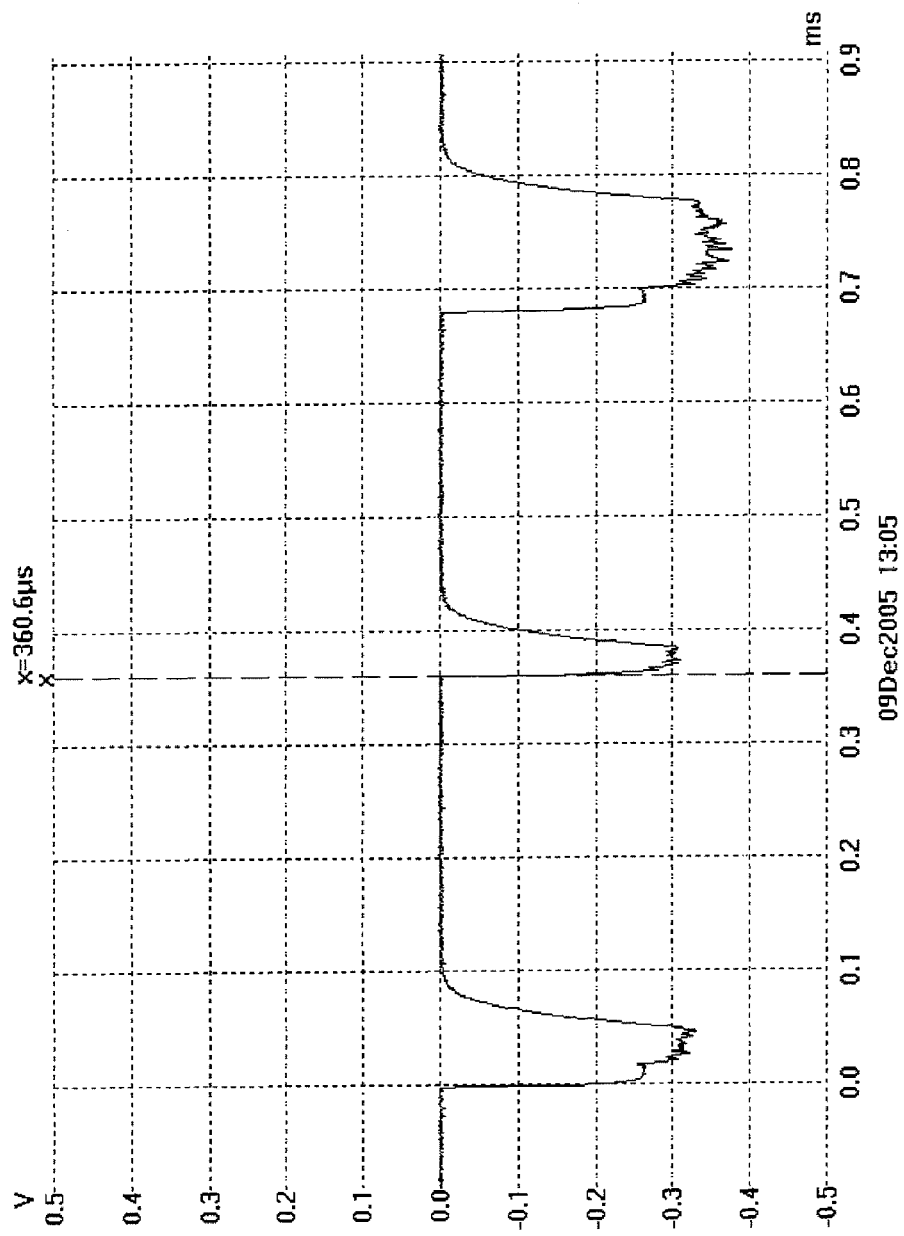
FIG. 6 shows the timing of a detected signal with the two connected MoCA bridge devices of FIG. 5.

FIG. 5 illustrates a test configuration with two MoCA bridges 21 and 22 with Ethernet devices 23 and 24, respectively, attached thereto, connected to a spectrum analyzer 25. FIG. 6 shows the timing of a detected signal with the two connected Ethernet and MoCA bridge devices 21 to 24, wherein the time between pulses is 360.6 μs (2.77 KHz).

Figure 7:
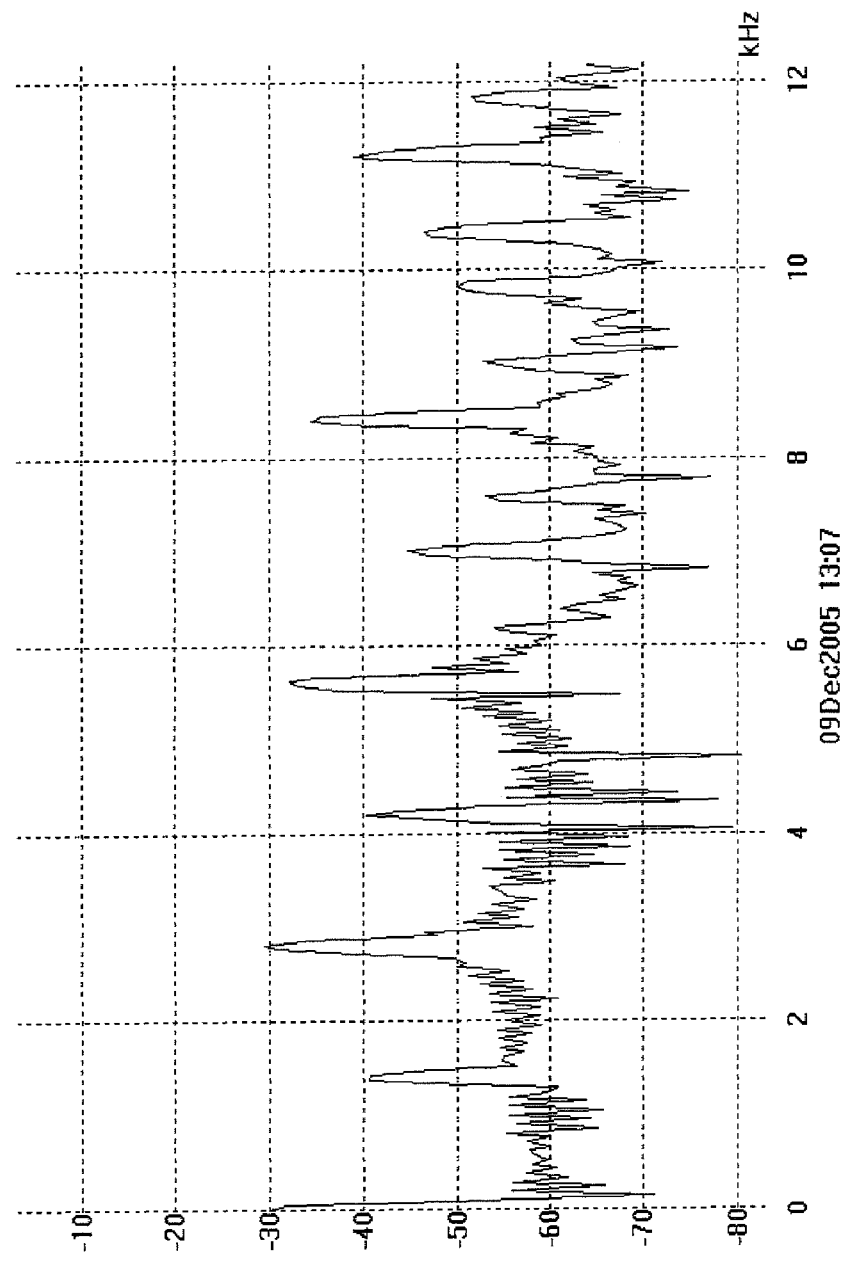
FIGS. 7 and 8 illustrate the detected spectrum of FIG. 6 with two different scales.
Figure 8:
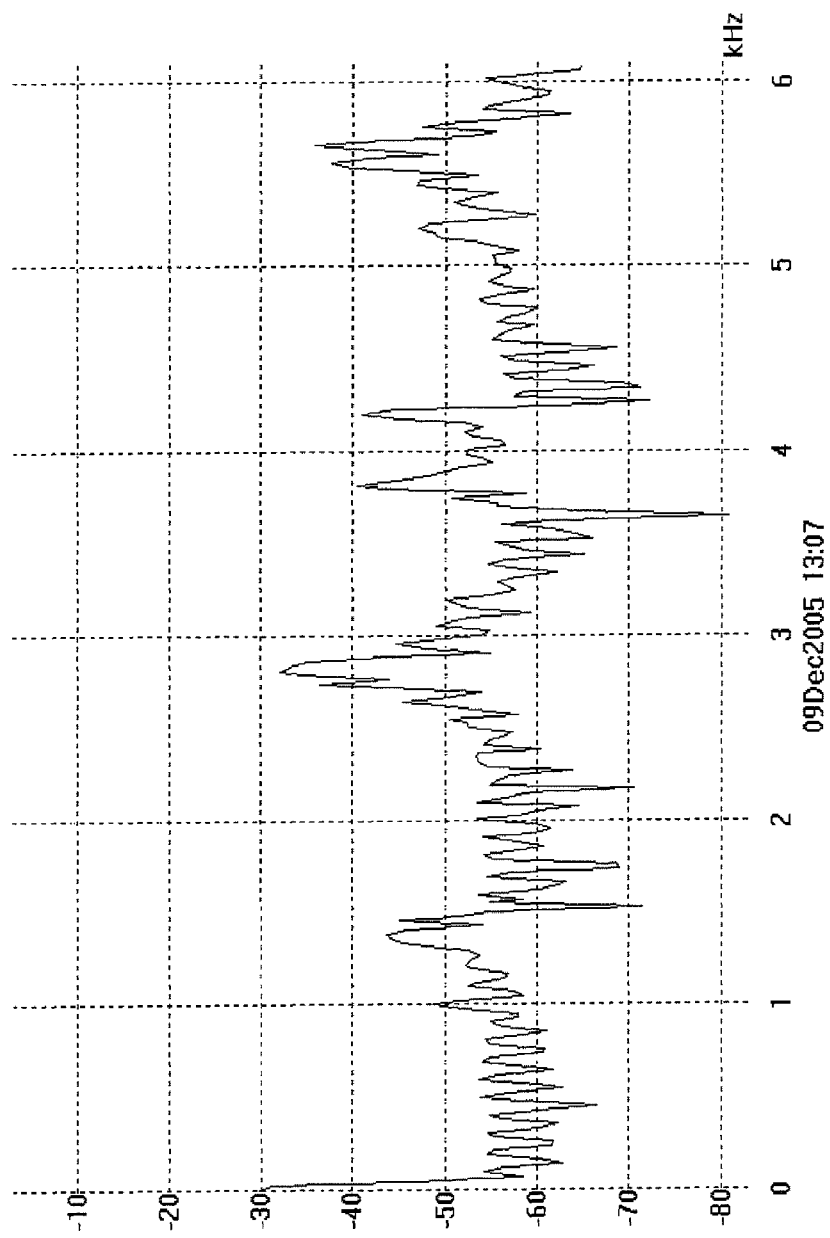
Figure 9:
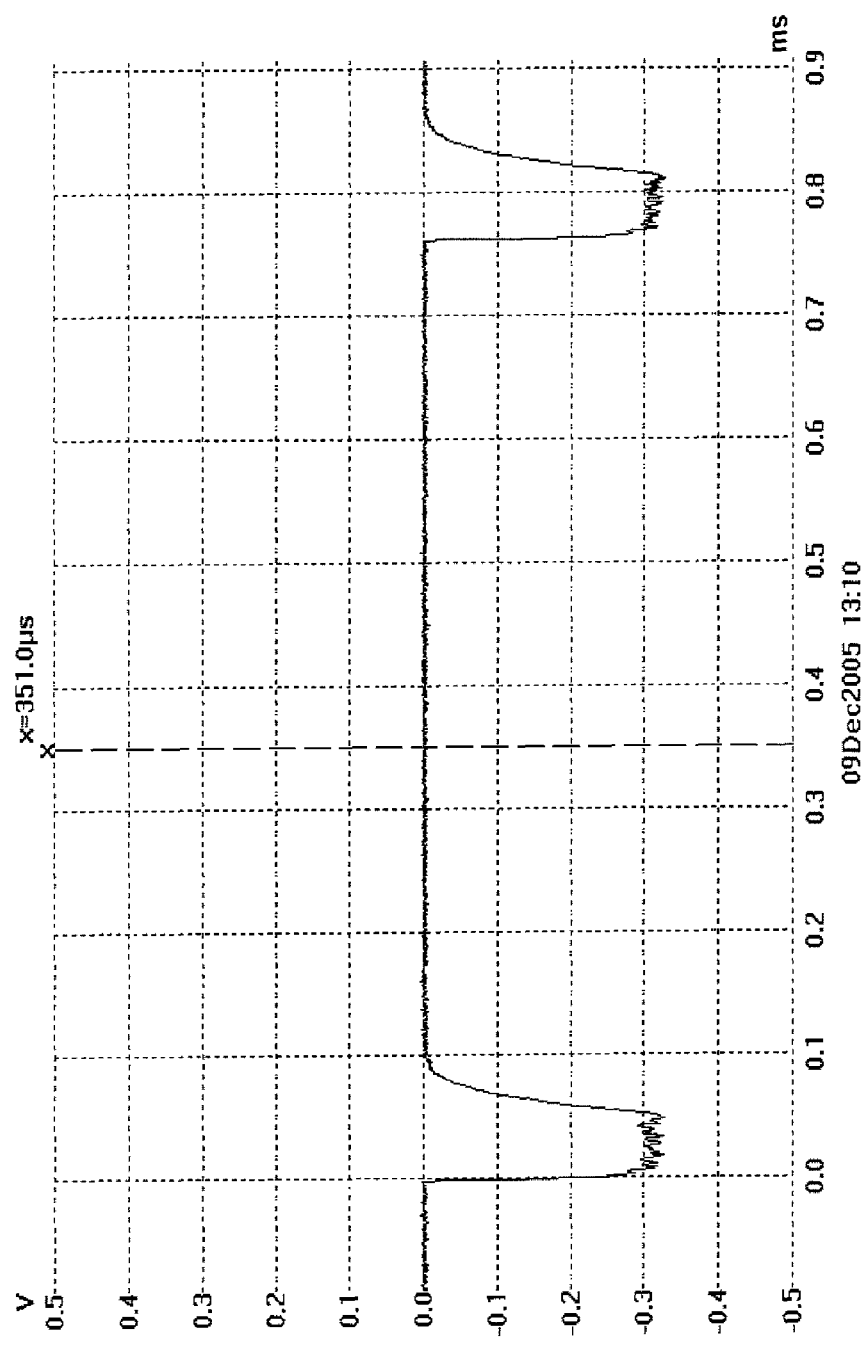
FIGS. 9 to 11 illustrate another mode that was captured was a 1.4 KHz data pulse rate, which seems to occur after a device has synced once then the connection is lost.
Figure 10:
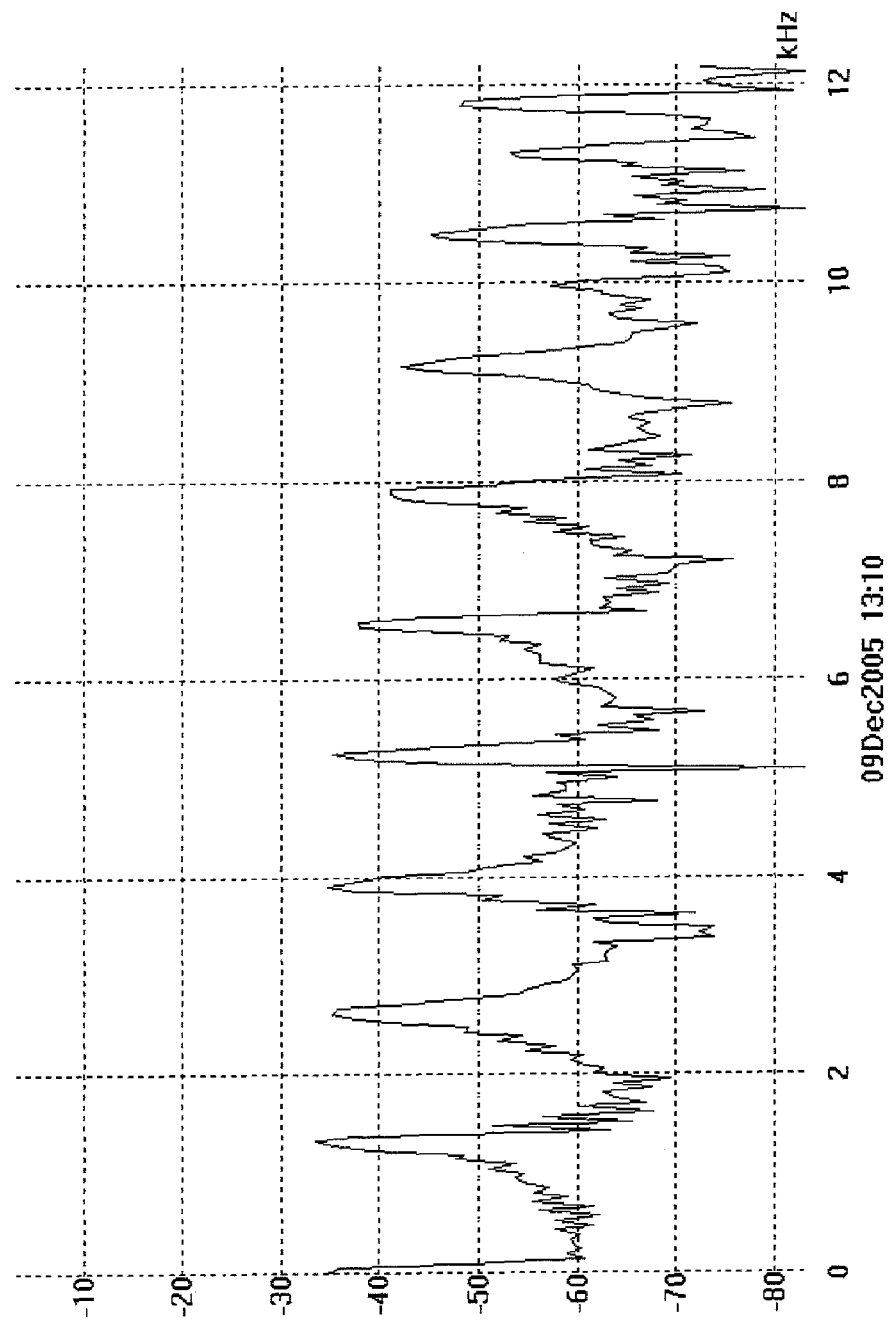
Figure 11:
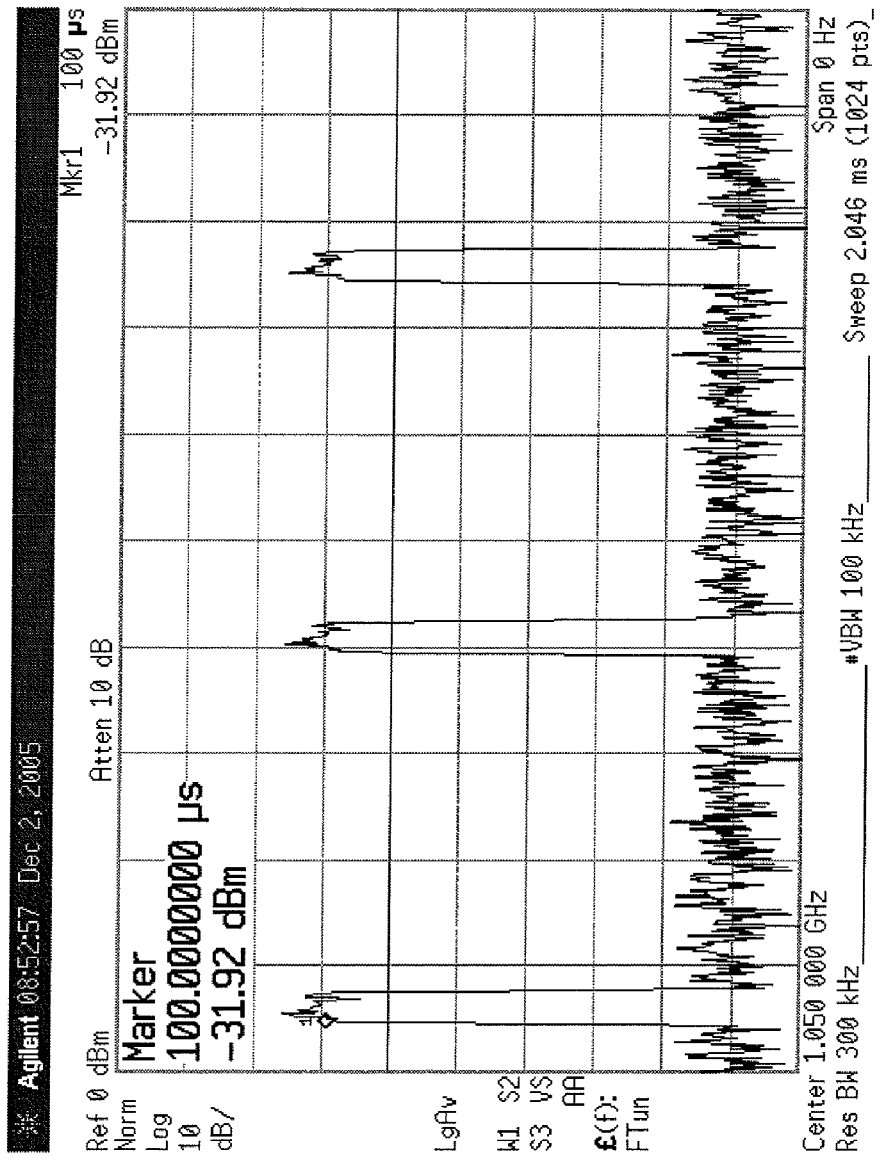

FIG. 7 shows the spectrum of the detected signal from the two connected Ethernet and MoCA bridge devices 21 to 24 with the 2.8 KHz product and its harmonics visible therein. FIG. 8 illustrates a portion of the same spectrum from 0 to 6 KHz, which shows both the 2.8 KHz product as well as the 100 Hz product. One other mode that was captured was a 1.4 KHz data pulse rate, illustrated in FIGS. 9 to 11, which seems to occur after a device has synced once then the connection is lost.

Figure 12:
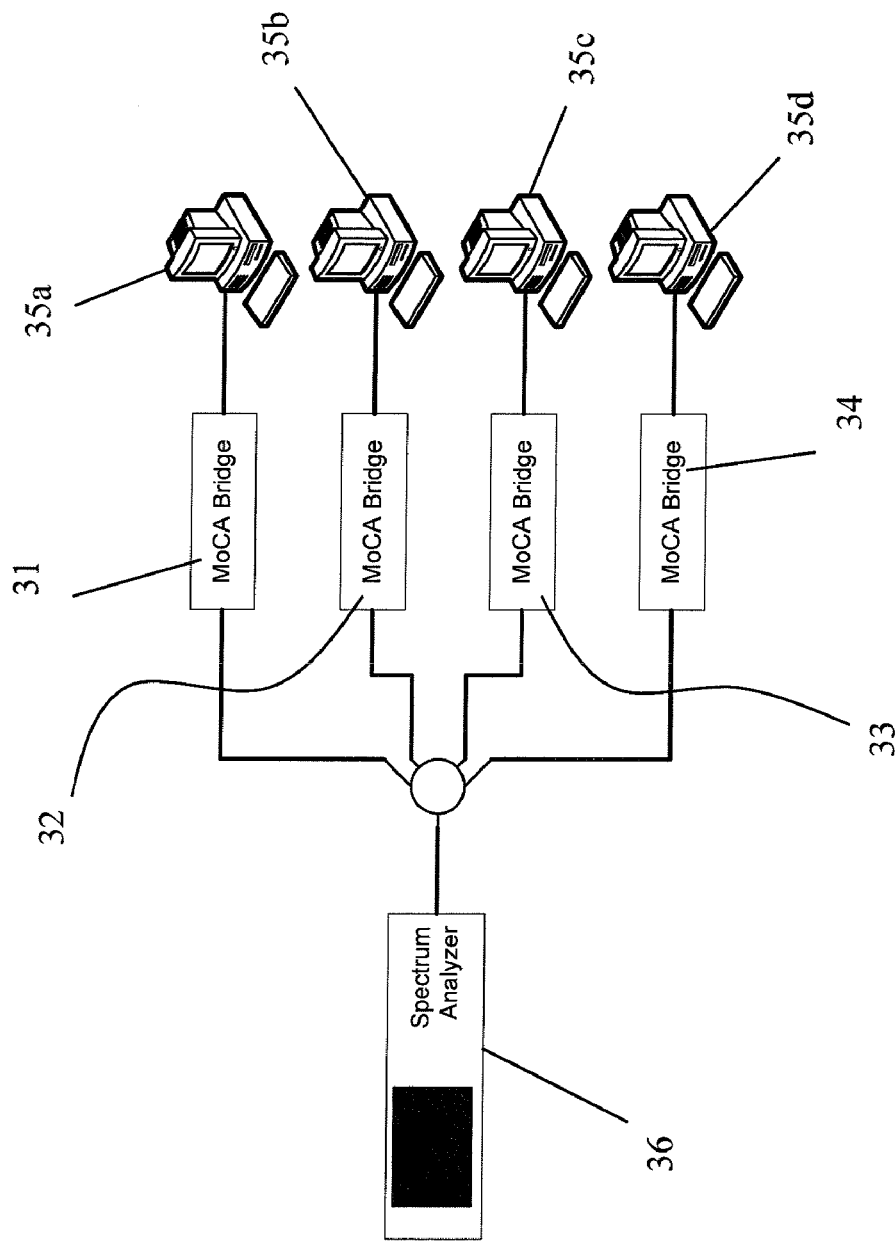
FIG. 12 is a schematic representation of a MoCA test arrangement with four MoCA bridge devices.
Figure 13:
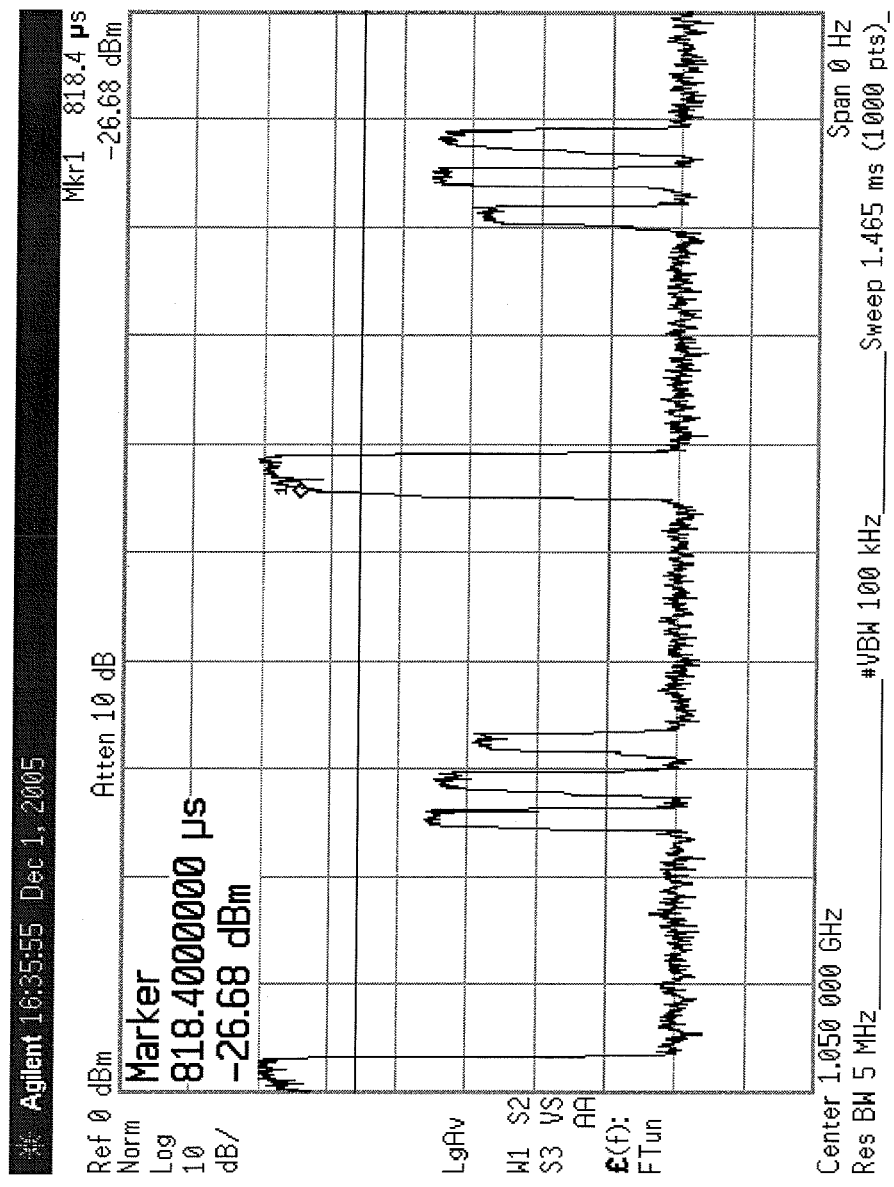
FIG. 13 is a graph showing the timing of the four MoCA devices of FIG. 12 with no data transfers.
Figure 14:
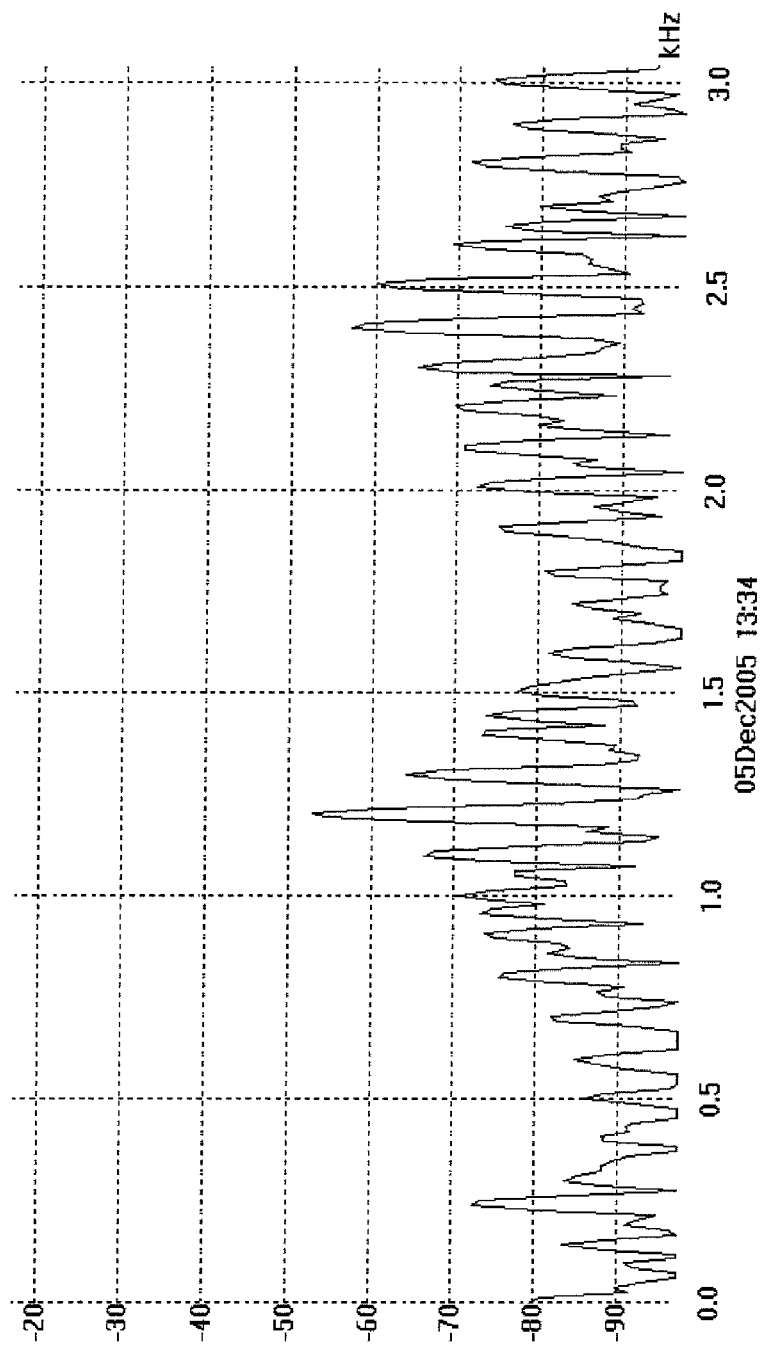
FIG. 14 illustrates a graph showing the detected spectrum up to 3 KHz from the test arrangement of FIG. 12.
Figure 15:
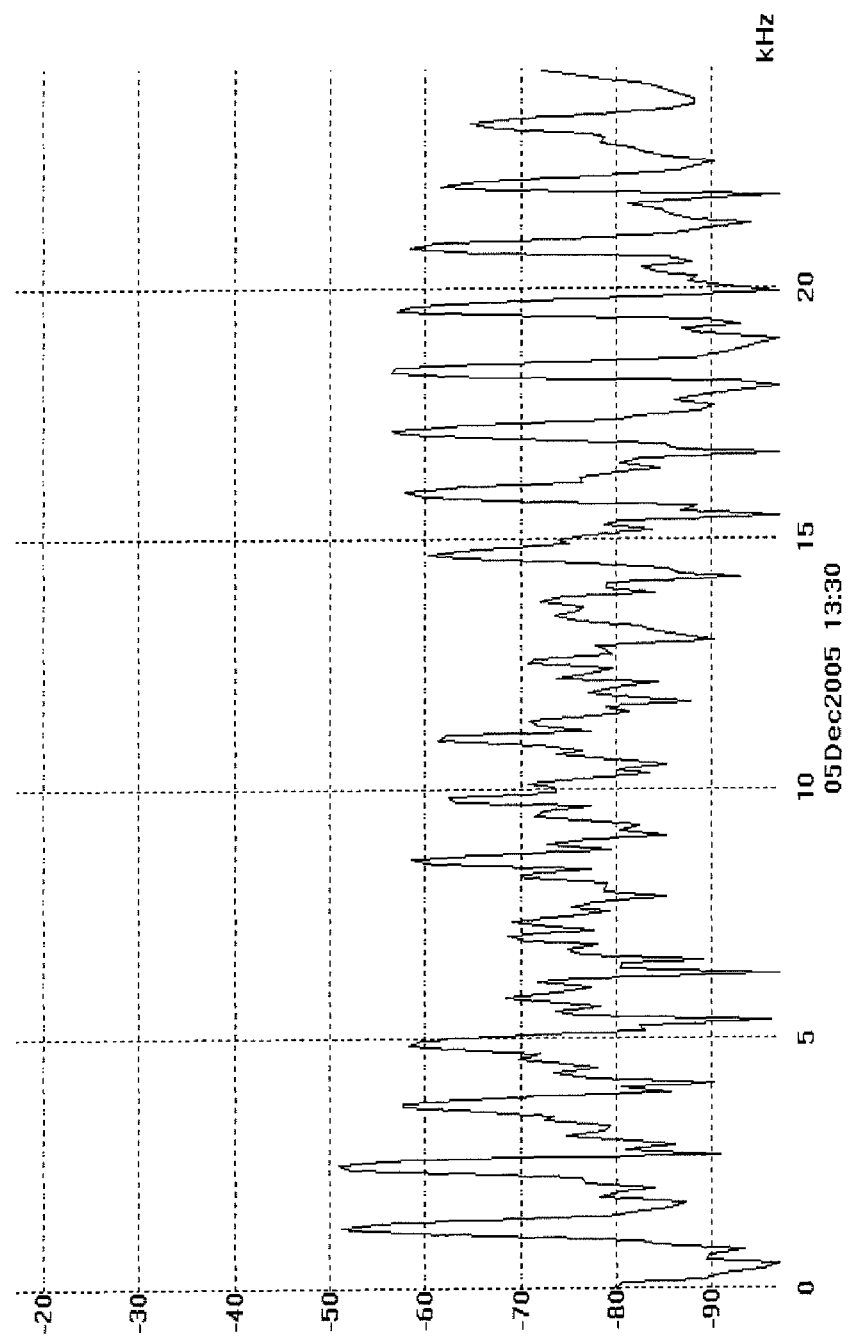
FIG. 15 illustrates a graph showing the detected spectrum up to 30 KHz from the test arrangement of FIG. 1.

FIG. 12 illustrates a test configuration with four MoCA bridges 31, 32, 33 and 34 with four Ethernet devices 35a to 35d and a spectrum analyzer 36. FIG. 13 is a graph showing the timing of four devices 31 to 34 with no data transfers. The level on three of the MoCA devices 31 to 34 is lower because they had long cable runs to the spectrum analyzer 36. The spectrums of the detected signal (FIGS. 14 and 15) show that the dominate signal is now in the 1.2 KHz range. The graphs of FIGS. 13, 14 and 15 show the 100 Hz signal is still present. FIG. 14 illustrates a graph showing the detected spectrum up to 3 KHz, while FIG. 15 illustrates a graph showing the detected spectrum up to 30 KHz.

The MoCA Signal can be configured to any one of the 29 channels in the 800 MHz to 1500 MHz range. Using a simple diode detector and an FFT, the MoCA signal can be identified by looking for the presence of a 100 Hz, 1.2 KHz, 1.4 KHz, or 2.8 KHz products in the detected signal.

| Frequencies in the Detected spectrum | Configuration |
| --- | --- |
| 100 Hz | One device connected |
| 100 Hz + 1.4 KHz + 2.8 KHz | Two devices connected |
| 100 Hz + 1.4 KHz | Two devices were connected but one has been lost or its signal level is low |
| 100 Hz + 1.2 KHz | More than two device are connected |

Since the 100 Hz is still present with any number of devices, detecting that signal could be used to detect the presence of a MoCA device(s) in most cases. In a MoCA network, the presence of a pulse that is about 90 μs to 110 μs wide and repeats approximately every 10 ms is indicative that the MoCA master present on the network. Once the RF pulse is identified, the system will take a power measurement during the time the pulse is active, and another while the pulse is inactive. With these values, the instrument can provide information with regard to the power, noise floor, and signal-to-noise ratio of the given home network at the particular test point.

Amplitude demodulation of the signal provides relatively unique signature compared to other signals that may be present in the 775 MHz to 1550 MHz frequency band. Other signals may include satellite and CATV.

Characterizations of the basic physical layer signals present on a coax network hosting HPNAv3 based devices have been tested to build enough understanding to develop circuits that can detect the presence of these signals. All testing was performed using Ready-Link CEB-401 Ethernet to HPNA Bridges 61 connected to a personal computer 62 via an Ethernet cable, which is used to create traffic on the HPNA network. RF measurements were performed using a Spectrum Analyzer/Oscilliscope 64, detected measurements were performed using a Wavetek D171 75 detector 63 and the Pico Scope digital USB Spectrum Analyzer/Oscilloscope 64 (200 Msps). Personal computer 66 hosts the software that controls the Pico Scope digital USB Spectrum Analyzer/Oscilloscope 64, and determines how the data is processed and displayed. (Time Domain Oscilloscope or Frequency Domain Spectrum Analyzer)

Figure 16:
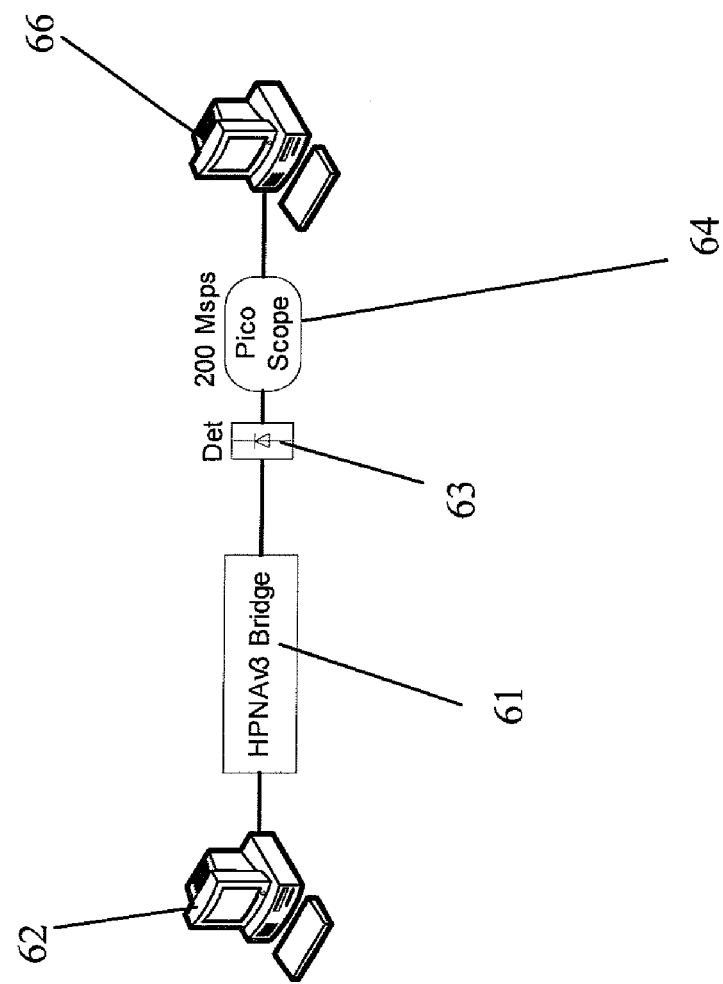
FIG. 16 is a schematic representation of a HPNA test arrangement with one HPNA bridge devices.

FIG. 16 illustrates the single HPNA bridge 61 with no Ethernet devices attached. A Personal Computer (PC) 62 is connected to an HPNA bridge via an Ethernet cable. The PC 62 is used to create traffic in the HPNA network.

Figure 17:
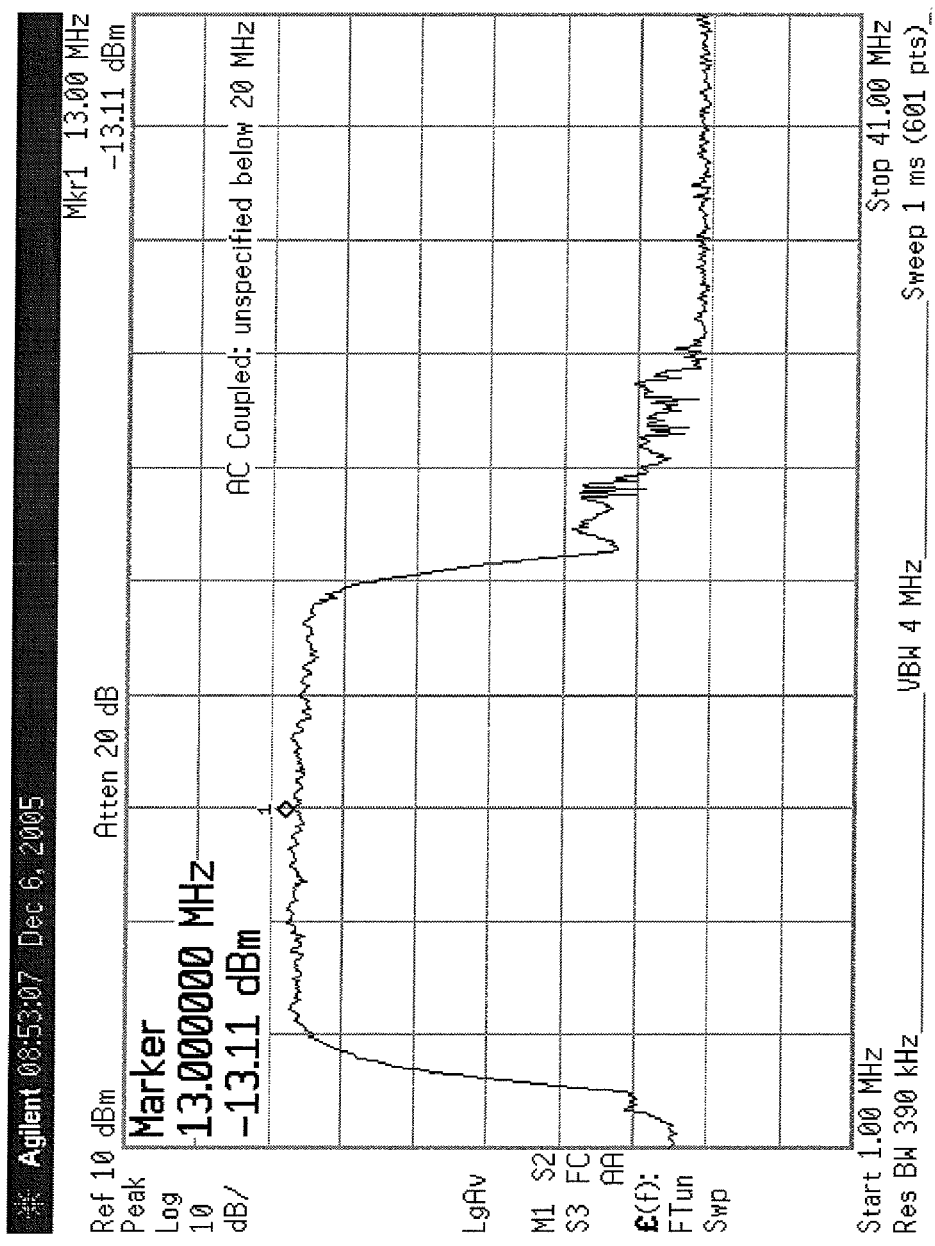
FIG. 17 illustrates a maximum hold trace of the spectrum directly out of the HPNA device of FIG. 16.

FIG. 17 illustrates a maximum hold trace of the spectrum directly out of the HPNA device 61, which is the signal that would be present at the back of the HPNA set top box, e.g. level −13 dBm (+35.75 dBmV); bandwidth: 20 MHz; signal to noise ratio: 55 dB.

Figure 18:
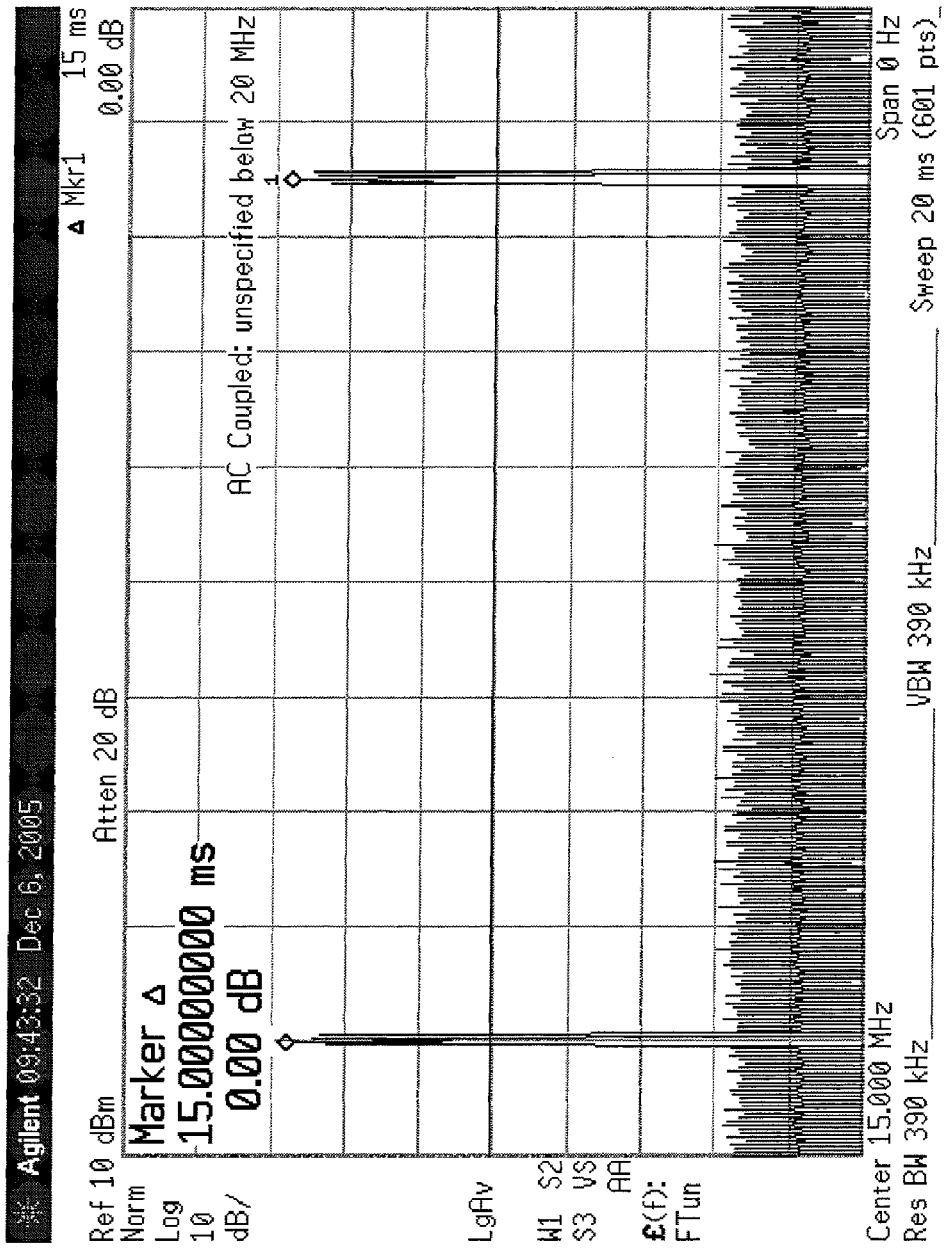
FIG. 18 is a zero span spectrum illustrating the timing of a Master Single device of FIG. 17.

The zero span spectrum, illustrated in FIG. 18, shows the timing of a HPNA Master single device 61, which is the typical signal present when a HPNA master set top is connected to the network and turned on, but no other devices are present. A test instrument could look for this signal, i.e. an HPNA RF signal frequency, which is a 16 MHz wide OFDM signal that is transmitted at approximately 0 dBm, to determine presence of the HPNA master device 61 and to verify the levels at the current test point are within acceptable level tolerance, for a client device to function properly.

Figure 19:
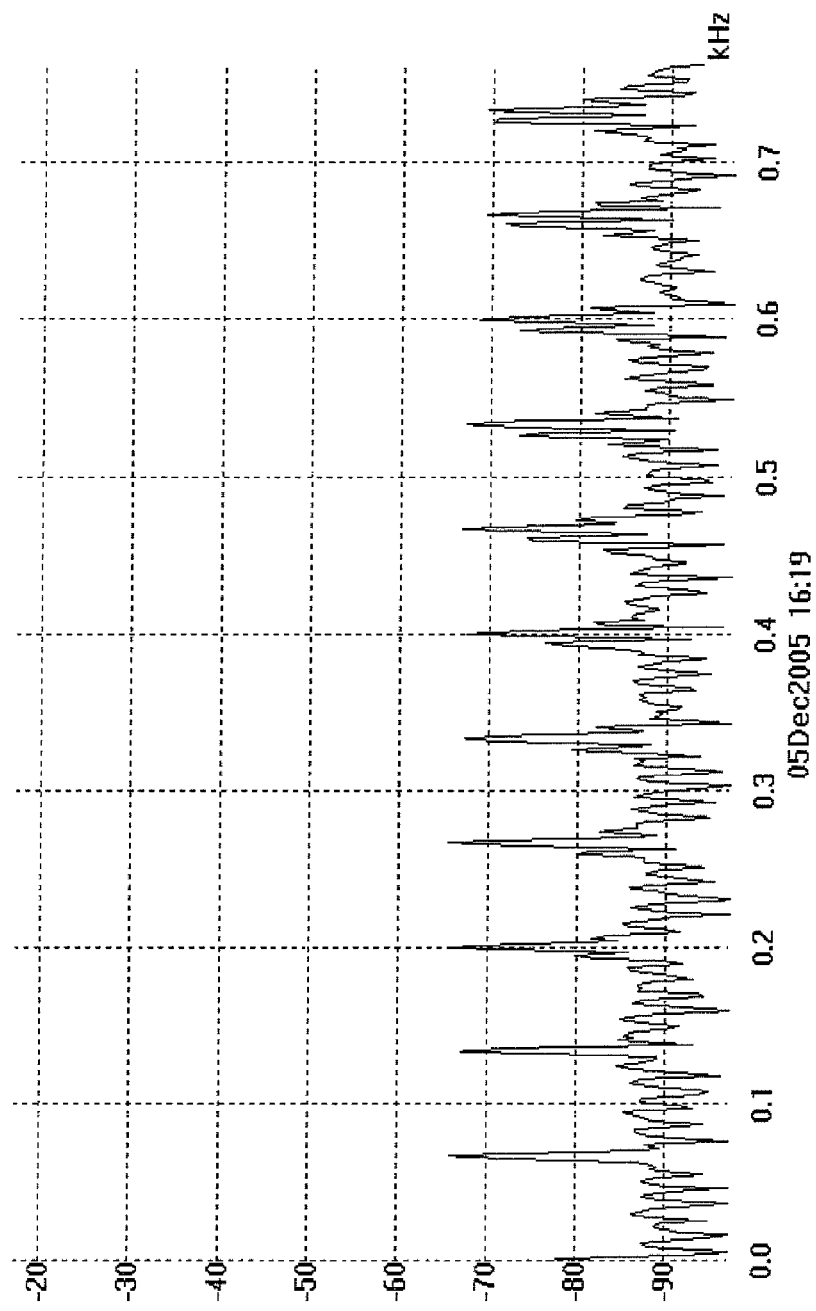
FIG. 19 illustrates an FFT of the detected spectrum of FIG. 18.

A single HPNA device 61 sends out an RF signal every 15 mS (66.67 Hz), as seen in FIG. 19, which illustrates an FFT of the detected spectrum therefrom. The product at approximately 67 Hz, e.g. 65 to 70 Hz, is prominent in the detected spectrum, and is present even when multiple devices are connected. This data burst may be an administration message searching for other devices or the master device timing control messages.

Figure 20:
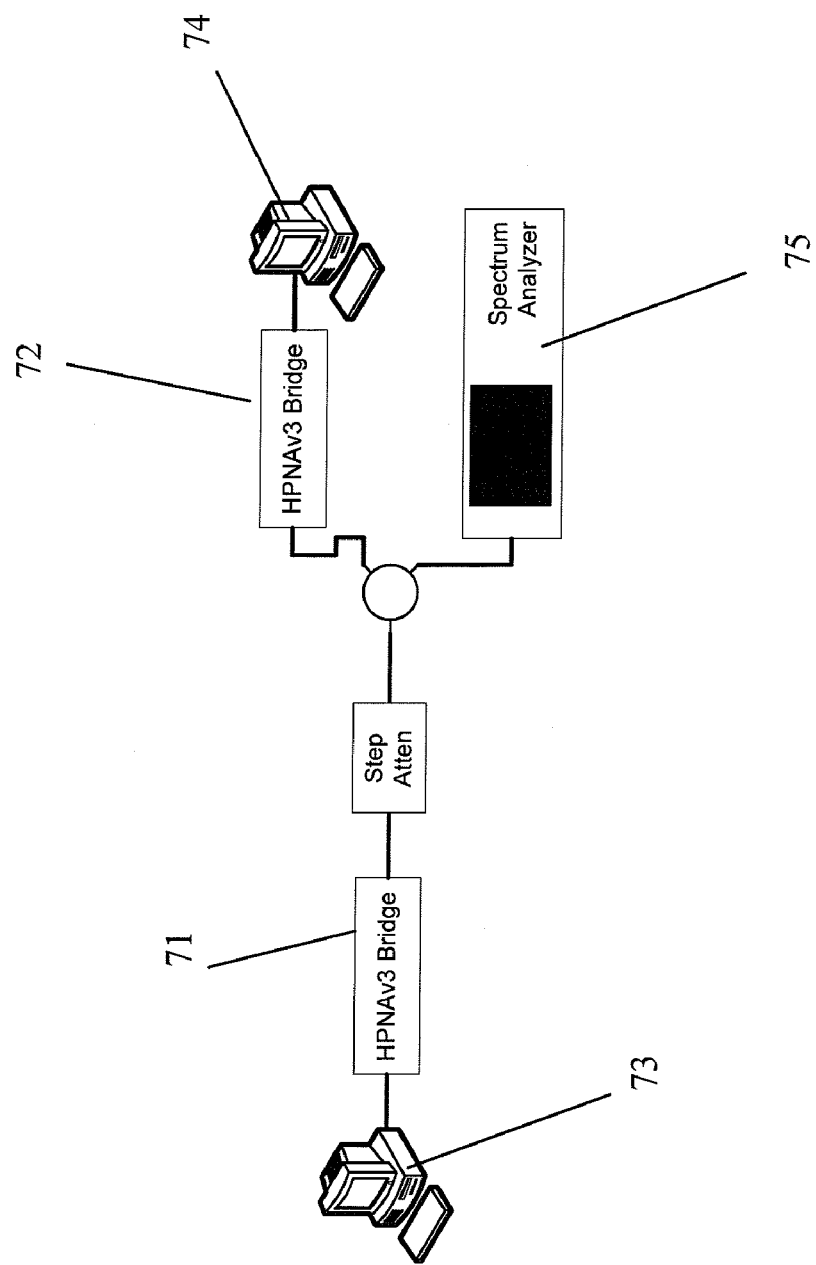
FIG. 20 is a schematic representation of a HPNA test arrangement with two HPNA bridge devices.
Figure 21:
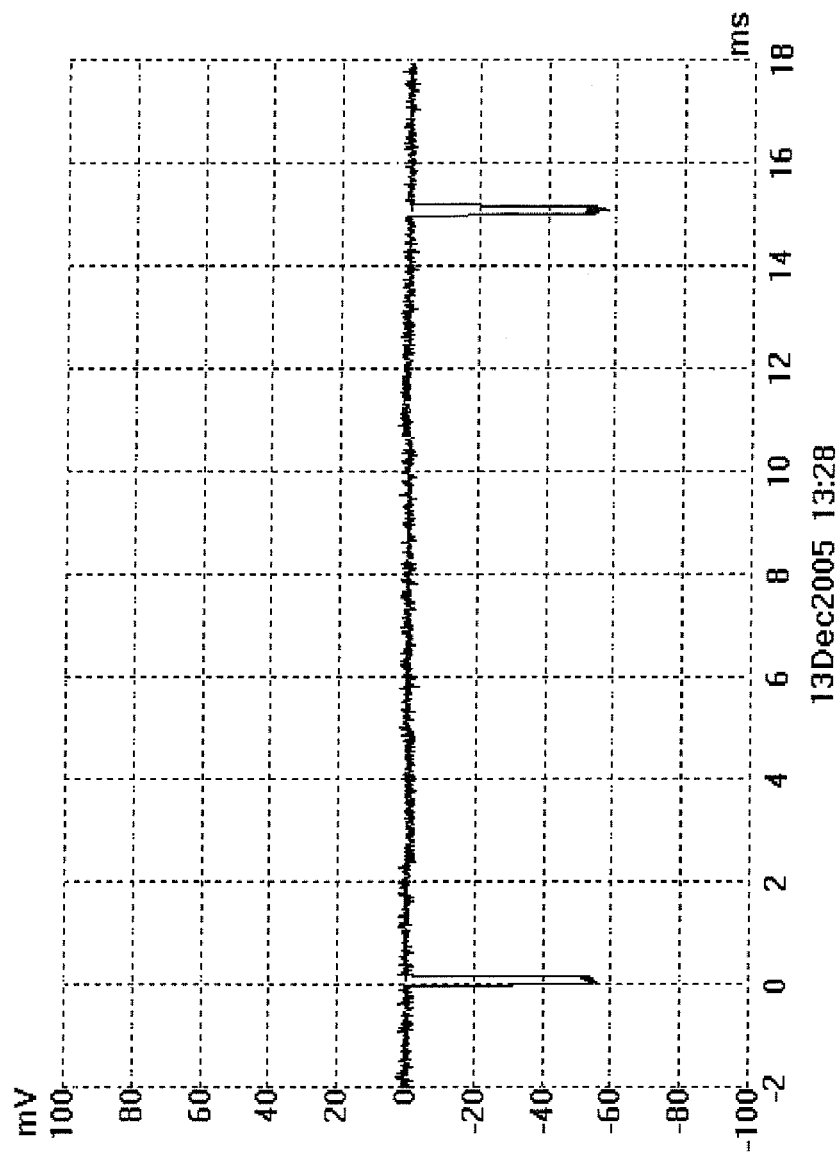
FIG. 21 shows the timing of a detected signal with the two connected devices of FIG. 20 without data being transmitted.
Figure 22:
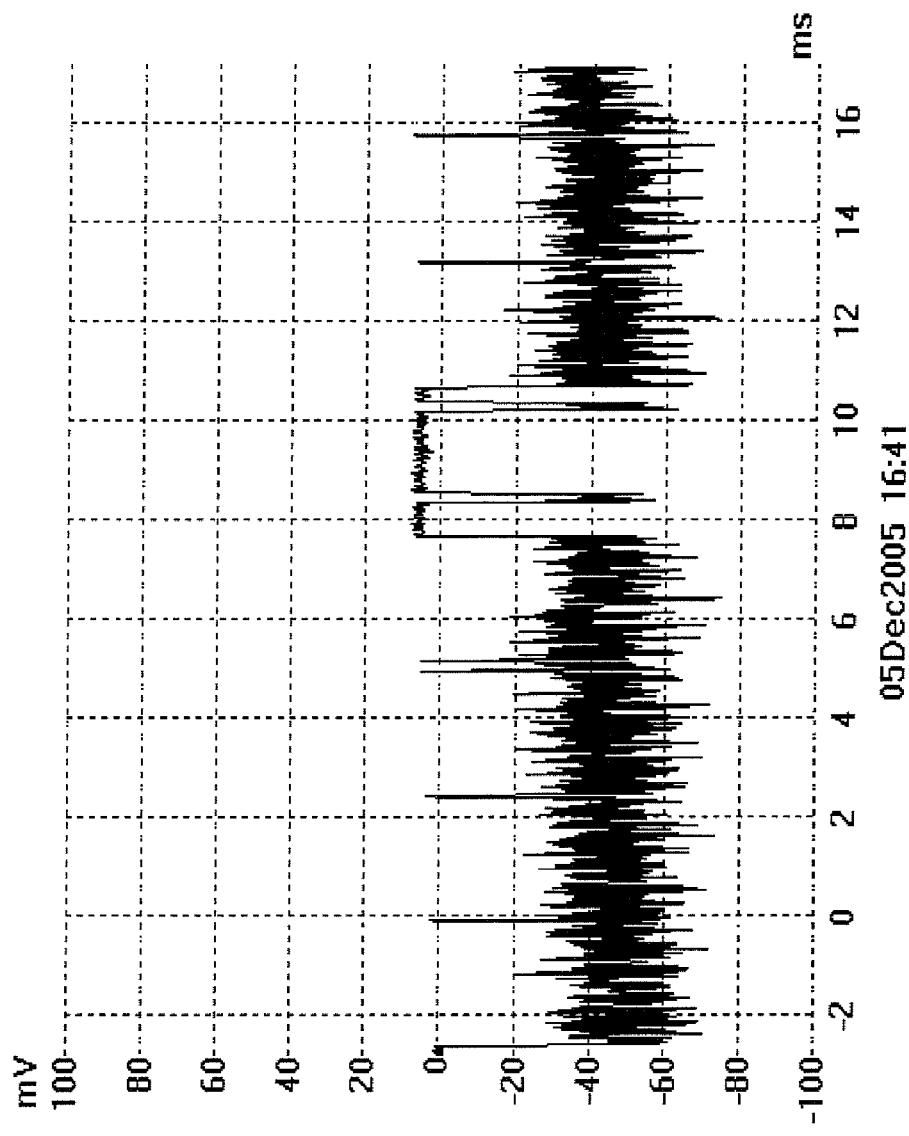
FIG. 22 shows the timing of a detected signal with the two connected devices of FIG. 20 with data being transmitted.

FIG. 20 shows a test arrangement with two HPNA bridges 71 and 72, and two connected Ethernet devices 73 and 74 connected to a spectrum analyzer 75. FIG. 21 shows the timing of the detected signal with the two connected devices 73 and 74 without data being transmitted, while FIG. 22 shows the timing of the detected signal with the two connected devices 73 and 74 with data being transmitted.

The HPNA (version 3) signal can be detected using a simple amplitude demodulator and an FFT, the signal can be identified by looking for the presence of a 66.7 Hz product in the detected signal. If the device is configured as a client device it only sends a RF pulse out once a second. In this case it may be hard to detect with an FFT on the amplitude demodulated signal.

The employment of the method according to the present invention will allow the implementation of a basic home network physical layer tester that is both low cost and lower power than a solution that contains a dedicated network chipset.

Figure 23:
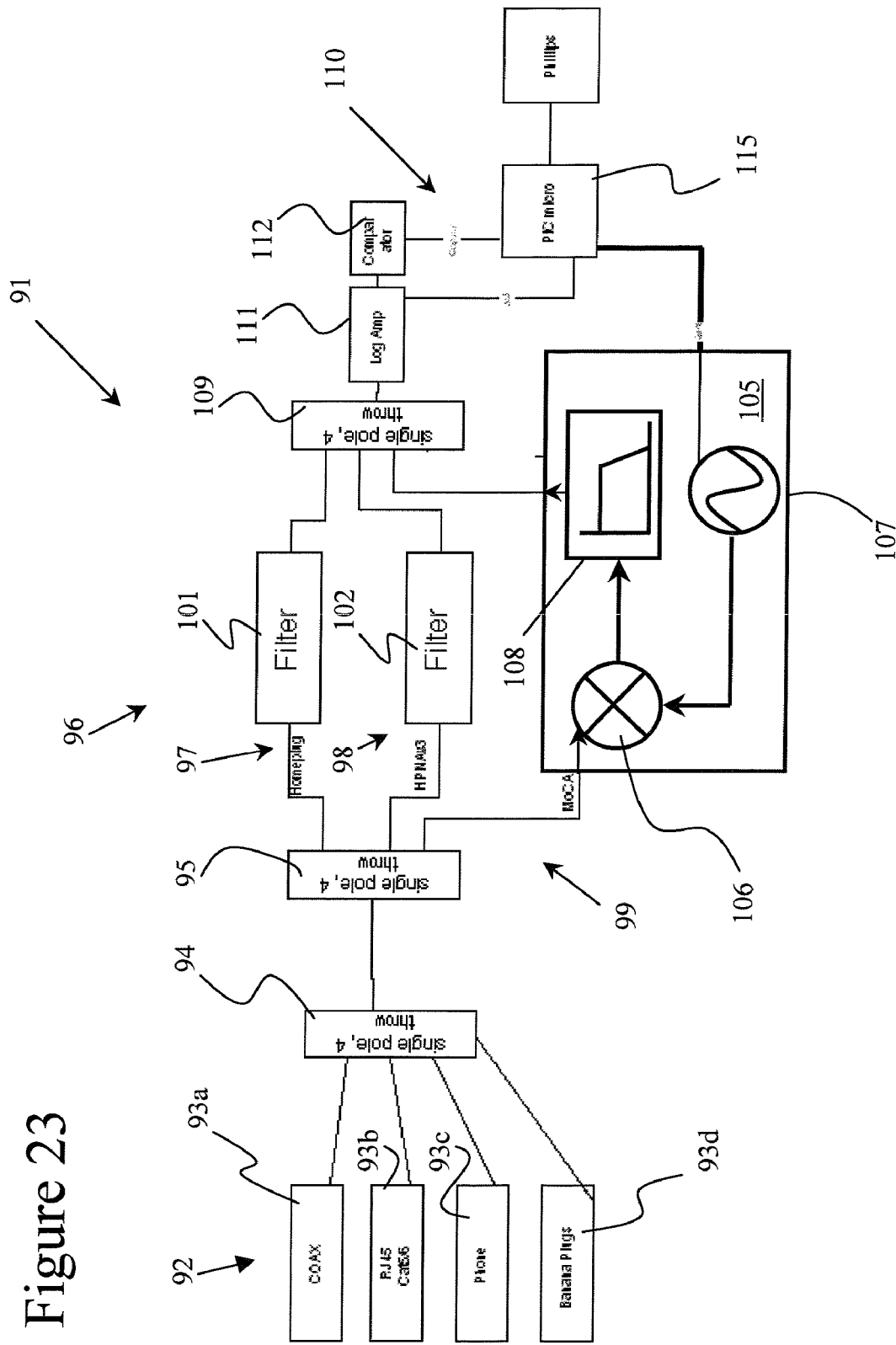
FIG. 23 is a schematic representation of the test device according to the present invention.

With reference to FIG. 23, a home network testing device 91, according to the present invention, includes an input port 92 with a first connector 93*a* for receiving an end of a coaxial cable for testing MoCA networks, a second connector 93*b* for receiving an end of a RJ45 Cat 56 cable for testing HPNA networks, a third connector 93*c* for receiving an end of a telephone cable, e.g. RJ11, for testing HPNA networks, and a fourth connector 93*d* including banana plugs for testing for HomePlug networks. The input port 92 can contain any combination of one or more of the aforementioned connectors 93*a* to 93*d* depending on the different types of home networks the testing device 91 is designed to test for. A first switch 94, e.g. a single pole four throw (spft), is used to select which connector 93*a* to 93*d* is to be connected to filter equipment 96, a second switch 95, e.g. a single pole four throw (spft), is used to select which section of the filter equipment 96 is connected to the selected connector 93*a* to 93*d*.

The filter equipment 96 includes filtering apparatus for each of the different types of home networks. In the illustrated embodiment, the filter equipment 96 includes a filter stage 97 for HomePlug networks, a filter stage 98 for HPNA networks, and a filter stage 99 for MoCA networks, but other home network filter apparatus are within the scope of this invention.

The HomePlug and HPNA stages 97 and 98 require first and second filtering apparatuses 101 and 102, respectively, to remove all signals except those in the measurement band (4 to 50 MHz). Typically, the HomePlug filter 97 is a 30 MHz low pass filter, and the HPNA filter passes signals in a range from 4 MHz to 12 MHz or 12 MHz to 28 MHz, depending on the HPNA band selected. MoCA is a protocol that has multiple channels and is in a high frequency range (800 to 1500 MHz). Each channel is 50 MHz wide. The signal conditioning, which is required for the MoCA signal, is provided in stage 99 and includes a signal down conversion followed by a filtering step, e.g. a 50 MHz low pass filter.

A MoCA down converter 105 is comprised of a frequency mixer 106 and a phase locked loop (PLL) local oscillator 107. A microcomputer or microprocessor 115 controls the PLL oscillator 107 to select which MoCA channel to tune in. The output of the mixer 106 is then transmitted to a filter 108 to remove all unwanted frequency products. The MoCA signals are in the 800 MHz to 1500 MHz frequency band. Since a MoCA network may have multiple channels it is necessary to be able to tune to and select a single desired channel. Accordingly, the local oscillator 107 is set to the same frequency as the desired channel, which will result in the oscillator channel being mixed with the desired MoCA channel by mixer 106 with one of the resultant products being base band. The low pass filter 108 removes all other channels and mixer products.

A first, a second or a third filtered signals from the first, second and third filter stages 97, 98 and 99, respectively, are fed to a third switch 109, e.g. a single pole three throw (sptt), which is synchronized with the second switch 95 to transmit the selected signal through the selected filter stage 97 to 99 to a testing or measuring section 110. The testing section 110 includes an amplitude demodulator or RF detector (log amp) 111, a comparator 112 and the microcomputer 115, e.g. a PIC microcomputer.

The testing equipment 110 is controlled by the microcomputer 115, which has two inputs and numerous control outputs, and includes an analog to digital converter (ADC) and a pulse shaping comparator. The analog to digital converted (ADC) is fed from the log amp 111, while the output of the log amp 111 is also fed into the pulse shaping comparator 112. The comparator 112 shapes the filtered pulse directed by the third switch 109 into a digital signal that triggers a measurement by the microcomputer 115.

The third switch 109 is controlled by the microcomputer 115, and enables the microcomputer 115 to select which filter stage 97 to 99, i.e. which RF signal, is routed to the log amp 111. The log amp 111 has an internal RF detector and circuitry that performs a LOG function on the detected output from the filter stages 97 to 99. The resultant voltage can then be measured by the analog to digital converter in the microcomputer 115 and represents the power input into the log amp 111. Since the data has already been converted to a LOG scale a simple slope and intercept equation can be applied to the ADC counts to convert it into an absolute dBmV or dBm power level. The comparator 112 enables the microcomputer 115 to accurately time the incoming RF pulse. The timing aspects, e.g. period and pulse width, are important to the detection algorithm.

The first, second and third switches 94, 95 and 109 can be controlled manually, i.e. by a technician selecting which connector 93*a* to 93*d* to connect to which of the first, second and third filter stages 97, 98 and 99, and which of the first, second and third filter stages 97, 98 and 99 to connect to the testing equipment 110. Alternatively, the first, second and third switches 94, 95 and 109 can be automated by a control means, e.g. stored in the microcomputer 115, to sequentially select each connector 93*a* to 93*d*, and then each filter stage 97, 98 and 99 to be connected to the testing equipment 110, whereby the type of home network technology found on any cable connected to the input port 92 can be determined quickly. For testing equipment designed for testing a single home network technology, the first, second and third switches 94, 95 and 109, as well as the extra filters can be omitted all together.

The signals being measured happen periodically in the form of a burst of RF. The signal from the log amp 111 is sent to the comparator 112 to be conditioned and shaped into a digital pulse, which is used to trigger the measurement engine in the microcomputer 115. The microcomputer 115 detects the rising edge of the pulse, which corresponds to the beginning of the RF pulse, then waits a preset time before taking an RF power measurement, which insures the power measurement is taken at the peak of the RF power. The microcomputer 115 also detects the falling edge and performs the same type of measurement to determine the level of the noise floor. The microcomputer 115 also has an internal timer to measure the period of the pulses. When the microcomputer 115 captures a set of pulses that correspond to any of the above-identified MoCA, HPNA or HomePlug pulses, the microcomputer 115 identifies the type of home network in use and reports the measured RF signal level and the signal to noise ratio.

As discussed above, the testing section 110 comprises the amplitude demodulator 111 for generating first, second and third voltage signals in the time domain from the first, second and third filtered signals, respectively. Accordingly, the microcomputer 115 can identify a MoCA signal in the home network by identifying a pulse in the first voltage signal that is about 90 μs to 110 μs wide and repeats approximately every 10 ms or a HPNA version 3 signal in the home network by identifying a pulse in the second filtered signal that is about 165 μs to 185 μs wide and repeats approximately every 15 ms. Alternatively, the testing section 110 can also include a means for performing an FFT, which is found in the microcomputer 115, to produce first, second and third transformed signals in the frequency domain, whereby a HPNA version 3 signal can be identified by the presence of a product at approximately 66.7 Hz in the second transformed signal, and a MoCA signal can be identified by the presence of a product selected from the group consisting of 100 Hz, 1.2 KHz, 1.4 KHz, and 2.8 KHz products in the first transformed signal. Transforming the first, second and third voltage signals is a way to determine the period that the pulse repeats.

Once a pulse is identified, the microcomputer 115 takes a first power measurement during the time the pulse is active, and second power measurement while the pulse is inactive; whereby the logic means determines power, noise floor, and signal-to-noise ratio of a given home network at a particular test point.

We claim:

1. A testing device for home networks comprising:
an input port for inputting a home network signal, the input port including connectors for mating with at least one cable selected from the group consisting of coaxial cables, telephone cables, and electrical cables;
a first filtering apparatus for removing all signals from the home network signal except those in a measurement band of a first home network technology generating a first filtered signal;
a second filtering apparatus for removing all signals from the home network signal except those in a measurement band of a second home network technology, different than the first home network technology, generating a second filtered signal;
measuring equipment connected to said first and second filtering apparatuses for determining which home network technology is present on a home network; and
switches for selecting which one of the connectors to be connected with which one of the first and second filtering apparatuses, and which one of the first and second filtering apparatuses to be connected with the measuring equipment;
wherein the measuring equipment comprises:
an amplitude demodulator for generating a resultant voltage signal; and
a transformer for conducting a fast Fourier transform on the resultant voltage signal generating a transformed signal.

2. The testing device according to claim 1, wherein the first home network technology is MoCA; and wherein the measuring equipment detects a MoCA signal by identifying a product selected from the group consisting of 100 Hz, 1.2 KHz, 1.4 KHz, and 2.8 KHz products in the transformed signal.

3. The testing device according to claim 2, wherein the first filtering apparatus comprises a 50 MHz low pass filter.

4. A testing device for home networks comprising:
an input port for inputting a home network signal, the input port including connectors for mating with at least one cable selected from the group consisting of coaxial cables, telephone cables, and electrical cables;
a first filtering apparatus for removing all signals from the home network signal except those in a measurement band of a first home network technology generating a first filtered signal;
a second filtering apparatus for removing all signals from the home network signal except those in a measurement band of a second home network technology, different than the first home network technology, generating a second filtered signal;
measuring equipment connected to said first and second filtering apparatuses for determining which home network technology is present on a home network; and
switches for selecting which one of the connectors to be connected with which one of the first and second filtering apparatuses, and which one of the first and second filtering apparatuses to be connected with the measuring equipment;
wherein the measuring equipment comprises an amplitude demodulator for generating a resultant voltage signal from the first or second filtered signal;
wherein the first home network technology is MoCA; and
wherein the measuring equipment detects a MoCA signal by identifying a pulse in the voltage signal that is about 90 μs to 110 μs wide and repeats approximately every 10 ms.

5. The testing device according to claim 4, wherein once a MoCA pulse is identified, the measuring equipment takes a first power measurement during the time the pulse is active, and second power measurement while the pulse is inactive; whereby the measuring equipment determines power, noise floor, and signal-to-noise ratio of a given home network at a particular test point.

6. The testing device according to claim 5, wherein the measuring equipment includes:
a comparator for conditioning and shaping the resultant voltage signal into a digital pulse; and
a microprocessor with an analog to digital converter for determining the power input into the amplitude demodulator.

7. The testing device according to claim 1, wherein the second home network technology is HPNA version 3; and
wherein the measuring equipment detects an HPNA version 3 signal by identifying a product at approximately 66.7 Hz in the transformed signal.

8. The testing device according to claim 7, wherein the second filtering apparatus comprises a 4 MHz to 12 MHz band pass filter or a 12 MHz to 28 MHz band pass filter.

9. A testing device for home networks comprising:
an input port for inputting a home network signal, the input port including connectors for mating with at least one cable selected from the group consisting of coaxial cables, telephone cables, and electrical cables;
a first filtering apparatus for removing all signals from the home network signal except those in a measurement band of a first home network technology generating a first filtered signal;
a second filtering apparatus for removing all signals from the home network signal except those in a measurement band of a second home network technology, different than the first home network technology, generating a second filtered signal;

measuring equipment connected to said first and second filtering apparatuses for determining which home network technology is present on a home network; and switches for selecting which one of the connectors to be connected with which one of the first and second filtering apparatuses, and which one of the first and second filtering apparatuses to be connected with the measuring equipment;

wherein the measuring equipment comprises an amplitude demodulator for generating a resultant voltage signal;

wherein the second home network technology is HPNA; and wherein the measuring equipment detects an HPNA signal by identifying a pulse in the voltage signal that is about 165 µs to 185 µs wide and repeats approximately every 15 ms.

10. The testing device according to claim 9, wherein once the pulse is identified, the measuring equipment takes a first power measurement during the time the pulse is active, and a second power measurement while the pulse is inactive; whereby the measuring equipment determines power, noise floor, and signal-to-noise ratio of a given home network at a particular test point.

11. The testing device according to claim 10, wherein the measuring equipment includes:
 a comparator for conditioning and shaping the resultant voltage signal into a digital pulse; and
 a microprocessor with an analog to digital converter for determining the power input into the amplitude demodulator.

12. The testing device according to claim 1, further comprising a third filtering apparatus for removing all signals from the home network signal except those in a measurement band of a third home network technology generating a third filtered signal.

13. The testing device according to claim 12, wherein the input port includes connectors for mating with electrical wires; and wherein the third home network technology is HomePlug.

14. The testing device according to claim 11, wherein the third filtering apparatus comprises a 30 MHz low pass filter.

15. A testing device for home networks comprising:
 an input port for inputting a home network signal, the input port including connectors for mating with a coaxial cable;
 a filtering apparatus for removing all signals from the home network signal except those in a measurement band of a MoCA home network technology generating a filtered signal; and
 measuring equipment comprising an amplitude demodulator for generating a resultant voltage signal from the filtered signal connected to said filtering apparatus for determining whether a pulse that is about 90 µs to 110 µs wide and repeats approximately every 10 ms is present in the voltage signal, which is indicative of a MoCA home network technology being present on a home network.

16. The testing device according to claim 15, wherein once a MoCA pulse is identified, the measuring equipment takes a first power measurement during the time the MoCA pulse is active, and second power measurement while the MoCA pulse is inactive; whereby the measuring equipment determines power, noise floor, and signal-to-noise ratio of the MoCA home network at a particular test point.

17. A testing device for home networks comprising:
 an input port for inputting a home network signal, the input port including connectors for mating with at least one cable selected from the group consisting of coaxial cables and telephone cables;
 a filtering apparatus for removing all signals from the home network signal except those in a measurement band of a HPNA home network technology generating a filtered signal; and
 measuring equipment comprising an amplitude demodulator for generating a resultant voltage signal from the filtered signal connected to said filtering apparatus for determining whether a pulse that is about 165 µs to 185 µs wide and repeats approximately every 15 ms is present in the voltage signal, which is indicative of a HPNA home network technology being present on a home network.

18. The testing device according to claim 17, wherein once a HPNA pulse is identified, the measuring equipment takes a first power measurement during the time the HPNA pulse is active, and second power measurement while the HPNA pulse is inactive; whereby the measuring equipment determines power, noise floor, and signal-to-noise ratio of the HPNA home network at a particular test point.

19. A testing device for home networks comprising:
 an input port for inputting a home network signal, the input port including connectors for mating with at least one cable selected from the group consisting of coaxial cables, telephone cables, and electrical cables;
 filtering means for removing all signals from the home network signal except those in a measurement band of a selected home network technology generating a first filtered signal; and
 measuring means connected to said filtering means for determining which home network technology is present on a home network;
 wherein the measuring means comprises: an amplitude demodulator for generating a resultant voltage signal; and transforming means for conducting a fast Fourier transform on the resultant voltage signal generating a transformed signal;
 wherein the measuring means detects a MoCA signal by identifying a product at approximately 100 Hz in the transformed signal; and
 wherein the measuring means detects an HPNA version 3 signal by identifying a produce at approximately 66.7 Hz in the transformed signal.

* * * * *